United States Patent
Zewail et al.

(10) Patent No.: US 12,096,420 B2
(45) Date of Patent: Sep. 17, 2024

(54) TIMING OFFSET INDICATIONS FOR HIGHER FREQUENCY BANDS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Wooseok Nam, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 382 days.

(21) Appl. No.: 17/683,882

(22) Filed: Mar. 1, 2022

(65) Prior Publication Data

US 2022/0322383 A1     Oct. 6, 2022

Related U.S. Application Data

(60) Provisional application No. 63/201,708, filed on May 10, 2021, provisional application No. 63/171,412, filed on Apr. 6, 2021.

(51) Int. Cl.
*H04W 72/1263*     (2023.01)
*H04L 5/00*     (2006.01)
*H04L 27/26*     (2006.01)
*H04W 72/0446*     (2023.01)
*H04W 72/20*     (2023.01)

(52) U.S. Cl.
CPC ....... *H04W 72/1263* (2013.01); *H04L 5/0053* (2013.01); *H04L 27/26025* (2021.01); *H04W 72/0446* (2013.01); *H04W 72/20* (2023.01)

(58) Field of Classification Search
CPC ... H04L 5/0078; H04L 5/0053; H04L 5/0007; H04L 27/26025; H04L 27/2666; H04L 5/0055; H04L 5/0044; H04W 72/20; H04W 72/0446; H04W 72/1263
See application file for complete search history.

(56) References Cited

U.S. PATENT DOCUMENTS

| | | | | |
|---|---|---|---|---|
| 2020/0029315 A1* | 1/2020 | Lin | ........................ | H04W 24/08 |
| 2023/0216632 A1* | 7/2023 | Go | ........................ | H04L 5/0094 370/329 |
| 2023/0217244 A1* | 7/2023 | Shaheen | ................. | H04W 8/24 455/422.1 |
| 2023/0262669 A1* | 8/2023 | Dai | ........................ | H04L 1/1854 370/329 |

(Continued)

*Primary Examiner* — Syed Ali
(74) *Attorney, Agent, or Firm* — Harrity & Harrity, LLP

(57) ABSTRACT

Various aspects of the present disclosure generally relate to wireless communication. In some aspects, a network node may transmit, and a user equipment (UE) may receive, a physical downlink control channel (PDCCH) that includes a grant for a communication scheduled via the PDCCH prior to a radio resource control configuration indicating a timing offset between the PDCCH and the communication scheduled via the PDCCH. The UE and/or the network node may determine a timing offset between the PDCCH and the communication scheduled via the PDCCH based at least in part on a default time domain resource assignment table for a subcarrier spacing associated with the communication. Numerous other aspects are described.

8 Claims, 12 Drawing Sheets

(56) References Cited

U.S. PATENT DOCUMENTS

| | | | |
|---|---|---|---|
| 2023/0262699 A1* | 8/2023 | Kusashima | H04L 5/0053 |
| 2023/0284218 A1* | 9/2023 | Chou | H04W 72/1273 |
| | | | 370/329 |
| 2023/0300806 A1* | 9/2023 | Haghighat | H04L 5/0053 |
| | | | 370/329 |
| 2023/0344570 A1* | 10/2023 | Jung | H04L 1/189 |
| 2023/0344605 A1* | 10/2023 | Ma | H04L 5/0055 |
| 2024/0008025 A1* | 1/2024 | Yoon | H04L 5/0055 |
| 2024/0031010 A1* | 1/2024 | Ye | H04B 7/18543 |

* cited by examiner

TIMING OFFSET INDICATIONS FOR HIGHER FREQUENCY BANDS

CROSS-REFERENCE TO RELATED APPLICATIONS

This Patent Application claims priority to U.S. Provisional Patent Application No. 63/171,412, filed on Apr. 6, 2021, entitled "TIMING OFFSET INDICATIONS FOR HIGHER FREQUENCY BANDS," and assigned to the assignee hereof, and to U.S. Provisional Patent Application No. 63/201,708, filed on May 10, 2021, entitled "TIMING OFFSET INDICATIONS FOR HIGHER FREQUENCY BANDS," and assigned to the assignee hereof. The disclosures of the prior Applications are considered part of and are incorporated by reference into this Patent Application in their entirety.

FIELD OF THE DISCLOSURE

Aspects of the present disclosure generally relate to wireless communication and to techniques and apparatuses for timing offset indications for higher frequency bands.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a network node, a physical downlink control channel (PDCCH) that includes a grant for a communication scheduled via the PDCCH prior to a radio resource control (RRC) configuration indicating a timing offset between the PDCCH and the communication scheduled via the PDCCH; and determining a timing offset between the PDCCH and the communication scheduled via the PDCCH based at least in part on a default time domain resource assignment (TDRA) table for a subcarrier spacing associated with the communication.

In some aspects, a method of wireless communication performed by a network node includes transmitting, to a UE, a PDCCH that includes a grant for a communication scheduled via the PDCCH prior to an RRC configuration indicating a timing offset between the PDCCH and the communication scheduled via the PDCCH; and determining a timing offset between the PDCCH and the communication scheduled via the PDCCH based at least in part on a default TDRA table for a subcarrier spacing associated with the communication.

In some aspects, a UE for wireless communication includes a memory and one or more processors, coupled to the memory, configured to: receive, from a network node, a PDCCH that includes a grant for a communication scheduled via the PDCCH prior to an RRC configuration indicating a timing offset between the PDCCH and the communication scheduled via the PDCCH; and determine a timing offset between the PDCCH and the communication scheduled via the PDCCH based at least in part on a default TDRA table for a subcarrier spacing associated with the communication.

In some aspects, a network node for wireless communication includes a memory and one or more processors, coupled to the memory, configured to: transmit, to a UE, a PDCCH that includes a grant for a communication scheduled via the PDCCH prior to an RRC configuration indicating a timing offset between the PDCCH and the communication scheduled via the PDCCH; and determine a timing offset between the PDCCH and the communication scheduled via the PDCCH based at least in part on a default TDRA table for a subcarrier spacing associated with the communication.

In some aspects, a non-transitory computer-readable medium storing a set of instructions for wireless communication includes one or more instructions that, when executed by one or more processors of a UE, cause the UE to: receive, from a network node, a PDCCH that includes a grant for a communication scheduled via the PDCCH prior to an RRC configuration indicating a timing offset between the PDCCH and the communication scheduled via the PDCCH; and determine a timing offset between the PDCCH and the communication scheduled via the PDCCH based at least in part on a default TDRA table for a subcarrier spacing associated with the communication.

In some aspects, a non-transitory computer-readable medium storing a set of instructions for wireless communication includes one or more instructions that, when executed by one or more processors of a network node, cause the network node to: transmit, to a UE, a PDCCH that includes a grant for a communication scheduled via the PDCCH prior to an RRC configuration indicating a timing offset between the PDCCH and the communication scheduled via the PDCCH; and determine a timing offset between the PDCCH and the communication scheduled via the PDCCH based at least in part on a default TDRA table for a subcarrier spacing associated with the communication.

In some aspects, an apparatus for wireless communication includes means for receiving, from a network node, a PDCCH that includes a grant for a communication scheduled via the PDCCH prior to an RRC configuration indicating a timing offset between the PDCCH and the communication scheduled via the PDCCH; and means for determining a timing offset between the PDCCH and the communication scheduled via the PDCCH based at least in part on a default TDRA table for a subcarrier spacing associated with the communication.

In some aspects, an apparatus for wireless communication includes means for transmitting, to a UE, a PDCCH that includes a grant for a communication scheduled via the PDCCH prior to an RRC configuration indicating a timing offset between the PDCCH and the communication scheduled via the PDCCH; and means for determining a timing offset between the PDCCH and the communication scheduled via the PDCCH based at least in part on a default TDRA table for a subcarrier spacing associated with the communication.

In some aspects, a method of wireless communication performed by a UE includes receiving, from a network node, a PDCCH that schedules a physical downlink shared channel (PDSCH); determining a timing offset between the PDSCH and a physical uplink control channel (PUCCH) to carry acknowledgement or negative acknowledgement (ACK/NACK) feedback for the PDSCH, wherein the timing offset between the PDSCH and the PUCCH is based at least in part on a subcarrier spacing; and transmitting, after reception of the PDSCH, the PUCCH to carry the ACK/NACK feedback for the PDSCH based at least in part on the timing offset.

In some aspects, a method of wireless communication performed by a network node includes transmitting, to a UE, a PDCCH that schedules a PDSCH; determining a timing offset between the PDSCH and a PUCCH to carry ACK/NACK feedback for the PDSCH, wherein the timing offset between the PDSCH and the PUCCH is based at least in part on a subcarrier spacing; and receiving, after transmission of the PDSCH, the PUCCH that carries ACK/NACK feedback for the PDSCH based at least in part on the timing offset.

In some aspects, a UE for wireless communication includes a memory and one or more processors, coupled to the memory, configured to: receive, from a network node, a PDCCH that schedules a PDSCH; determine a timing offset between the PDSCH and a PUCCH to carry ACK/NACK feedback for the PDSCH, wherein the timing offset between the PDSCH and the PUCCH is based at least in part on a subcarrier spacing; and transmit, after reception of the PDSCH, the PUCCH to carry the ACK/NACK feedback for the PDSCH based at least in part on the timing offset.

In some aspects, a network node for wireless communication includes a memory and one or more processors, coupled to the memory, configured to: transmit, to a UE, a PDCCH that schedules a PDSCH; determine a timing offset between the PDSCH and a PUCCH to carry ACK/NACK feedback for the PDSCH, wherein the timing offset between the PDSCH and the PUCCH is based at least in part on a subcarrier spacing; and receive, after transmission of the PDSCH, the PUCCH that carries ACK/NACK feedback for the PDSCH based at least in part on the timing offset.

In some aspects, a non-transitory computer-readable medium storing a set of instructions for wireless communication includes one or more instructions that, when executed by one or more processors of a UE, cause the UE to: receive, from a network node, a PDCCH that schedules a PDSCH; determine a timing offset between the PDSCH and a PUCCH to carry ACK/NACK feedback for the PDSCH, wherein the timing offset between the PDSCH and the PUCCH is based at least in part on a subcarrier spacing; and transmit, after reception of the PDSCH, the PUCCH to carry the ACK/NACK feedback for the PDSCH based at least in part on the timing offset.

In some aspects, a non-transitory computer-readable medium storing a set of instructions for wireless communication includes one or more instructions that, when executed by one or more processors of a network node, cause the network node to: transmit, to a UE, a PDCCH that schedules a PDSCH; determine a timing offset between the PDSCH and a PUCCH to carry ACK/NACK feedback for the PDSCH, wherein the timing offset between the PDSCH and the PUCCH is based at least in part on a subcarrier spacing; and receive, after transmission of the PDSCH, the PUCCH that carries ACK/NACK feedback for the PDSCH based at least in part on the timing offset.

In some aspects, an apparatus for wireless communication includes means for receiving, from a network node, a PDCCH that schedules a PDSCH; means for determining a timing offset between the PDSCH and a PUCCH to carry ACK/NACK feedback for the PDSCH, wherein the timing offset between the PDSCH and the PUCCH is based at least in part on a subcarrier spacing; and means for transmitting, after reception of the PDSCH, the PUCCH to carry the ACK/NACK feedback for the PDSCH based at least in part on the timing offset.

In some aspects, an apparatus for wireless communication includes means for transmitting, to a UE, a PDCCH that schedules a PDSCH; means for determining a timing offset between the PDSCH and a PUCCH to carry ACK/NACK feedback for the PDSCH, wherein the timing offset between the PDSCH and the PUCCH is based at least in part on a subcarrier spacing; and means for receiving, after transmission of the PDSCH, the PUCCH that carries ACK/NACK feedback for the PDSCH based at least in part on the timing offset.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
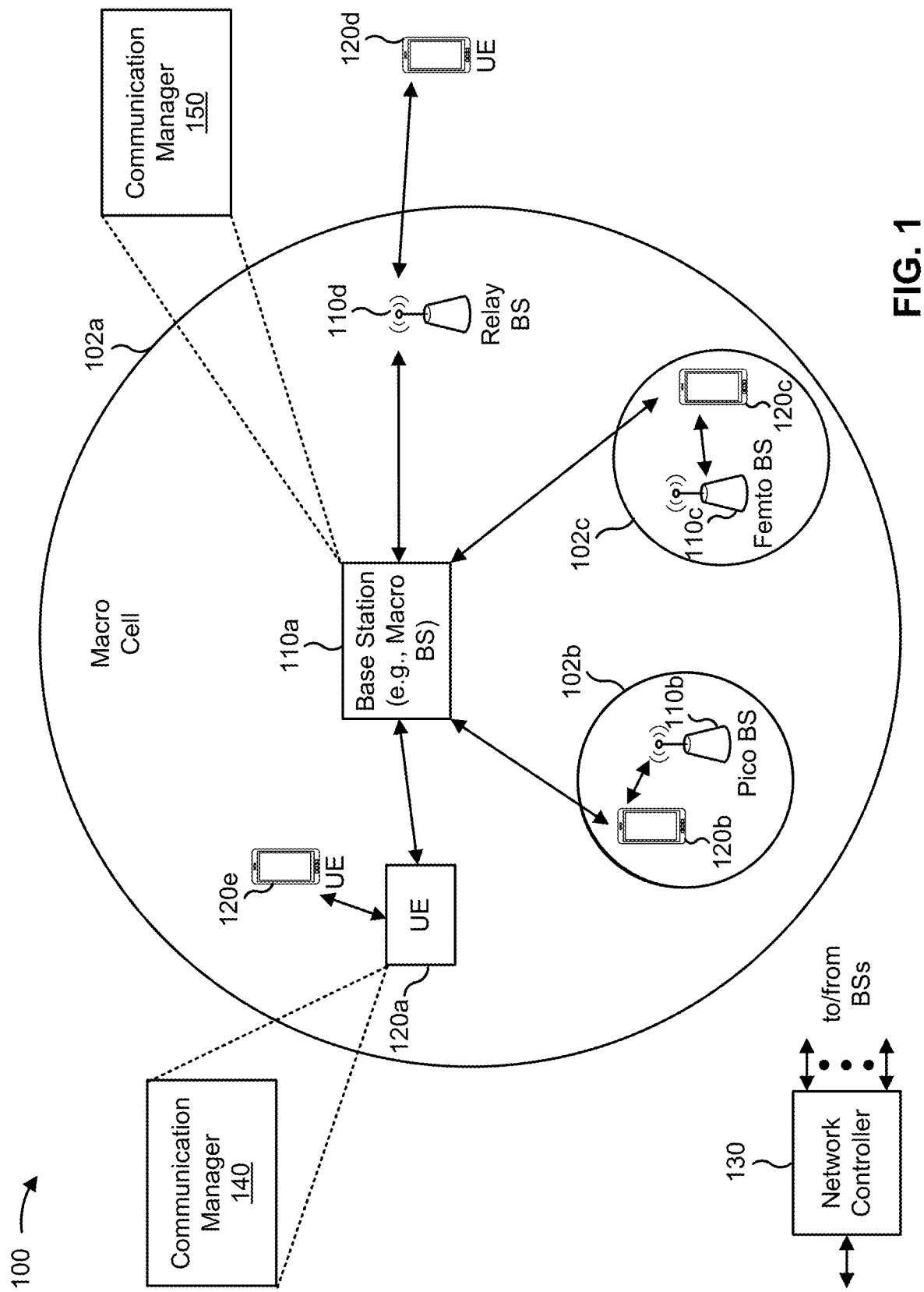
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, access point (AP), transmit receive point (TRP), or cell), or one or more units (or one or more components) performing base station functionality, may be implemented as an aggregated base station (also known as a standalone base station or a monolithic base station) or a disaggregated base station. As used herein, the term "network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some aspects, the UE 120 may include a communication manager 140. As described in more detail elsewhere herein, the communication manager 140 may receive, from a network node, a physical downlink control channel (PDCCH) that includes a grant for a communication scheduled via the PDCCH prior to a radio resource control (RRC) configuration indicating a timing offset between the PDCCH and the communication scheduled via the PDCCH; and determine a timing offset between the PDCCH and the communication scheduled via the PDCCH based at least in part on a default time domain resource assignment (TDRA) table for a subcarrier spacing associated with the communication. Additionally, or alternatively, the communication manager 140 may receive, from a network node, a PDCCH that schedules a physical downlink shared channel (PDSCH); determine a timing offset between the PDSCH and a physical uplink control channel (PUCCH) to carry acknowledgement or negative acknowledgement (ACK/NACK) feedback for the PDSCH, wherein the timing offset between the PDSCH and the PUCCH is based at least in part on a subcarrier spacing; and transmit, after reception of the PDSCH, the PUCCH to carry the ACK/NACK feedback for the PDSCH based at least in part on the timing offset. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, a PDCCH that includes a grant for a communication scheduled via the PDCCH prior to an RRC configuration indicating a timing offset between the PDCCH and the communication scheduled via the PDCCH; and determine a timing offset between the PDCCH and the communication scheduled via the PDCCH based at least in part on a default TDRA table for a subcarrier spacing associated with the communication. Additionally, or alternatively, the communication manager 150 may transmit, to a UE 120, a PDCCH that schedules a PDSCH; determine a timing offset between the PDSCH and a PUCCH to carry ACK/NACK feedback for the PDSCH, wherein the timing offset between the PDSCH and the PUCCH is based at least in part on a subcarrier spacing; and receive, after transmission of the PDSCH, the PUCCH that carries ACK/NACK feedback for the PDSCH based at least in part on the timing offset. Additionally, or alternatively, the communication manager 150 may perform one or more other operations described herein.

As indicated above, FIG. 1 is provided as an example. Other examples may differ from what is described with regard to FIG. 1.

Figure 2:
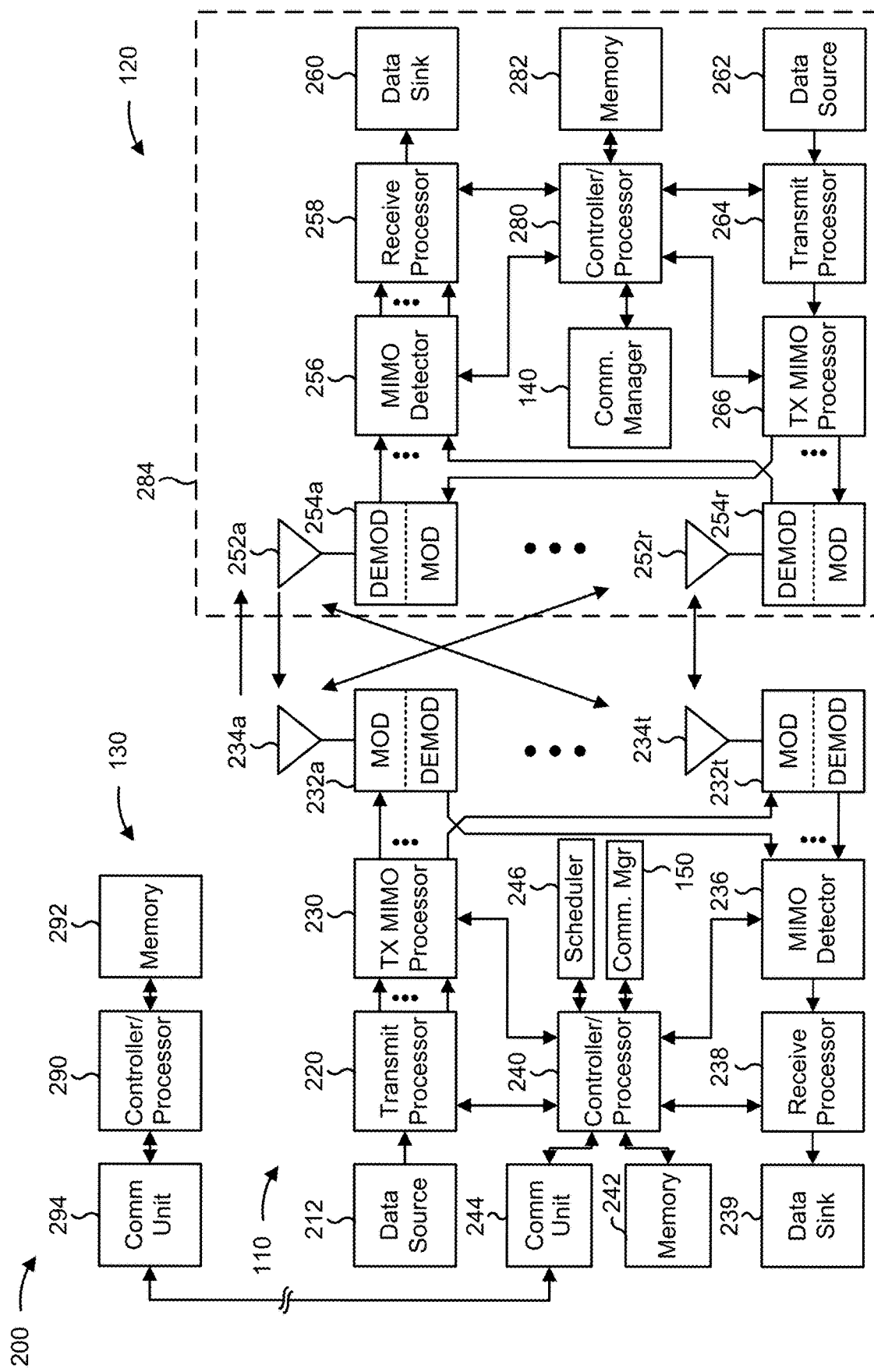
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a network node (e.g., the base station 110), a physical downlink control channel (PDCCH) that includes a grant for a communication scheduled via the PDCCH prior to a radio resource control (RRC) configuration indicating a timing offset between the PDCCH and the communication scheduled via the PDCCH; and/or means for determining a timing offset between the PDCCH and the communication scheduled via the PDCCH based at least in part on a default time domain resource assignment (TDRA) table for a subcarrier spacing associated with the communication. In some aspects, the UE 120 includes means for receiving, from a network node (e.g., the base station 110), a PDCCH that schedules a physical downlink shared channel (PDSCH); means for determining a timing offset between the PDSCH and a physical uplink control channel (PUCCH) to carry acknowledgement or negative acknowledgement (ACK/NACK) feedback for the PDSCH, wherein the timing offset between the PDSCH and the PUCCH is based at least in part on a subcarrier spacing; and/or means for transmitting, after reception of the PDSCH, the PUCCH to carry the ACK/NACK feedback for the PDSCH based at least in part on the timing offset. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to the UE 120, a PDCCH that includes a grant for a communication scheduled via the PDCCH prior to an RRC configuration indicating a timing offset between the PDCCH and the communication scheduled via the PDCCH; and/or means for determining a timing offset between the PDCCH and the communication scheduled via the PDCCH based at least in part on a default TDRA table for a subcarrier spacing associated with the communication. In some aspects, the base station 110 includes means for transmitting, to the UE 120, a PDCCH that schedules a PDSCH; means for determining a timing offset between the PDSCH and a PUCCH to carry ACK/NACK feedback for the PDSCH, wherein the timing offset between the PDSCH and the PUCCH is based at least in part on a subcarrier spacing; and/or means for receiving, after transmission of the PDSCH, the PUCCH that carries ACK/NACK feedback for the PDSCH based at least in part on the timing offset. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3A:
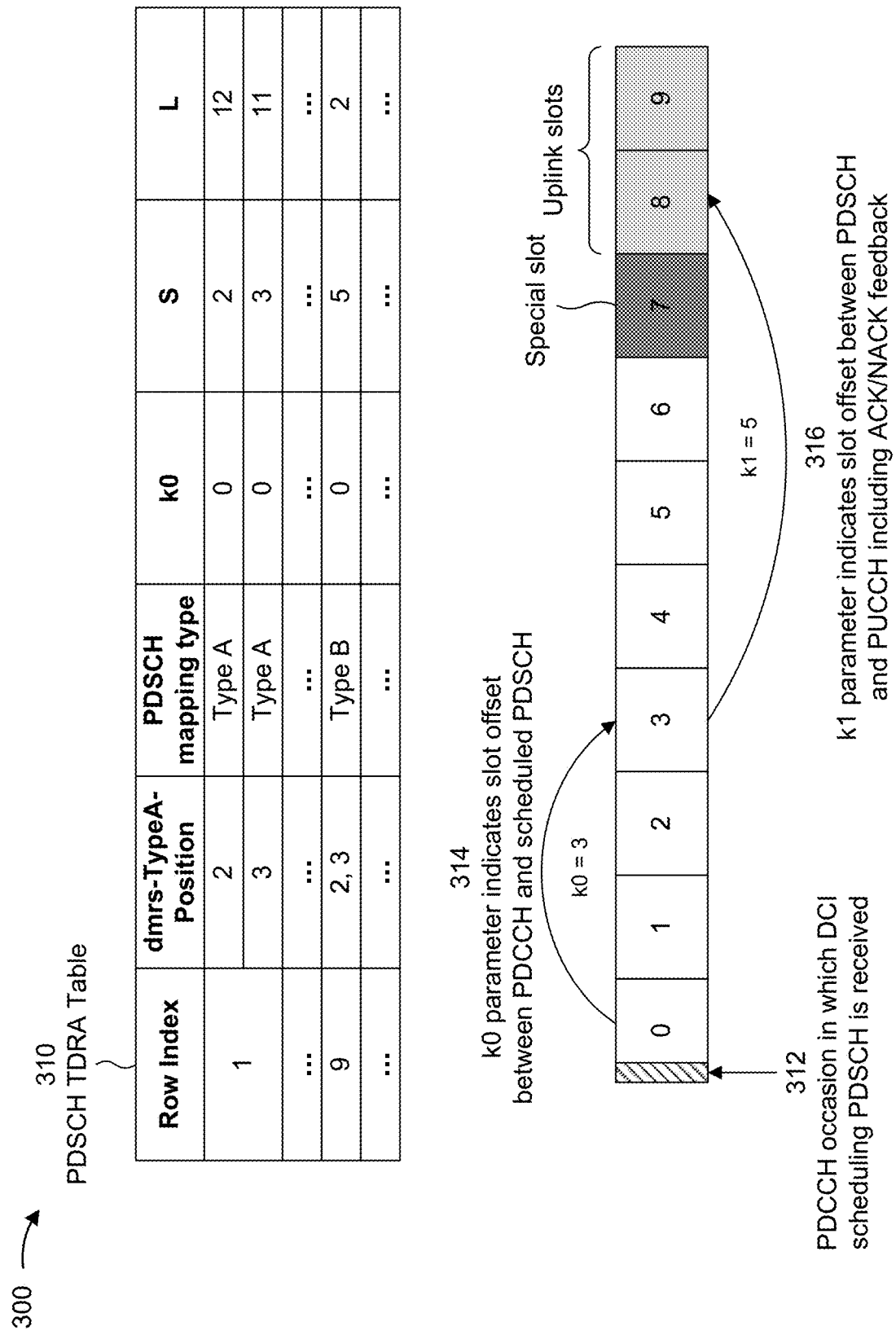
FIGS. 3A-3B are diagrams illustrating examples of time domain resource assignments, in accordance with the present disclosure.
Figure 3B:
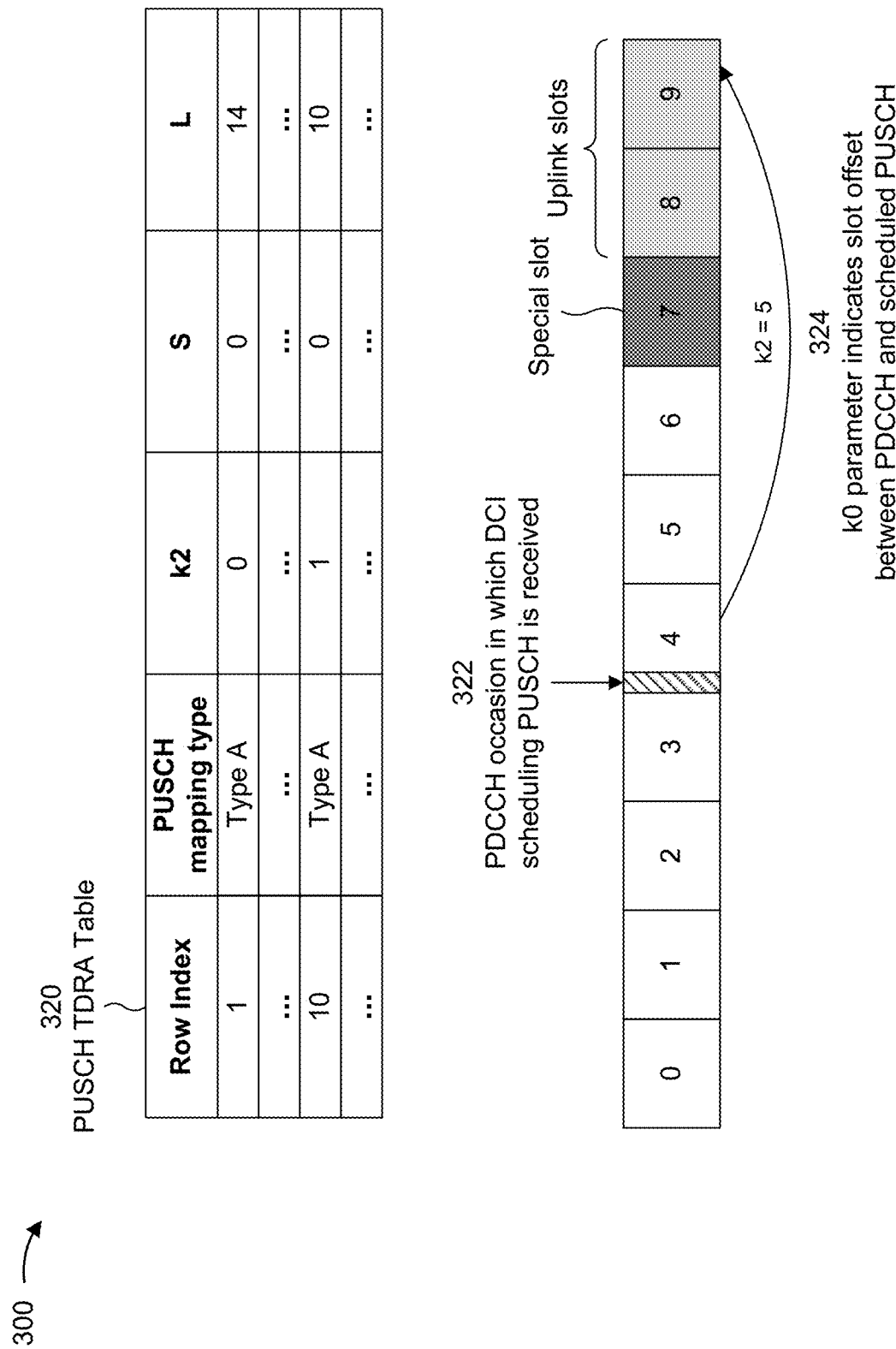

FIGS. 3A-3B are diagrams illustrating examples 300 of TDRAs, in accordance with the present disclosure. FIG. 3A shows an example downlink TDRA table 310 and FIG. 3B shows an example uplink TDRA table 320. The downlink TDRA table 310 may be, for example, a physical downlink shared channel (PDSCH) TDRA table. The uplink TDRA table 320 may be, for example, a physical uplink shared channel (PUSCH) TDRA table. In some aspects, the base station 110 and the UE 120 may use different TDRA tables than those shown in FIGS. 3A-3B, such as for different configurations, different cells, and/or different sub-carrier spacings of cells.

When scheduling a downlink communication or an uplink communication, a base station 110 may transmit a physical downlink control channel (PDCCH) carrying downlink control information (DCI) that indicates a TDRA for the downlink or uplink communication. For example, the DCI may include a TDRA field that includes a TDRA index value. The TDRA index value may indicate a row index of a corresponding TDRA table, and the row index may correspond to a set of TDRA parameters (sometimes referred to as scheduling parameters or scheduling information). The base station 110 and the UE 120 may use the TDRA parameters in the corresponding row index for the downlink or uplink communication scheduled via the DCI. In the examples shown in FIGS. 3A-3B, a TDRA index value of m in the DCI may correspond to a row index of m+1 in the TDRA table. For example, a TDRA index value of 0 may correspond to a row index of 1.

As shown in FIG. 3A, for a downlink communication (e.g., a PDSCH communication), the TDRA parameters may include, for example, a k0 value, an S value, and an L value. The k0 value may represent a timing offset (e.g., in number of slots) between a slot containing the scheduling DCI (carrying a grant that schedules the PDSCH communication) and a slot containing the scheduled PDSCH communication (scheduled via the scheduling DCI). For example, as shown in FIG. 3A, and by reference number 312, a UE may receive DCI scheduling a PDSCH in a PDCCH monitoring occasion of slot number 0, and a value of the k0 parameter may indicate the slot in which the UE can expect to receive the PDSCH scheduled via the DCI. For example, as shown by reference number 314, the UE may expect to receive the PDSCH in slot number 3 based on receiving the scheduling DCI in slot number 0 with the k0 parameter indicating a timing offset of three (3) slots. The S value may represent a starting symbol for the PDSCH communication in the indicated slot. The L value may represent a length (e.g., a number of consecutive symbols) of the PDSCH communication (e.g., in the indicated slot). In some cases, the S value and the L value may collectively be referred to as a start and length indicator value (SLIV). In some aspects, the same row index value may correspond to a different set of TDRA parameters depending on a Type A DMRS position (e.g., a symbol within a resource block that contains the DMRS) and/or a PDSCH mapping type (e.g., indicating a starting symbol of the DMRS, a length of the DMRS, and/or whether slot-based scheduling or mini-slot-based scheduling is used). Furthermore, in some aspects, a k1 parameter may be used to indicate a timing offset between the PDSCH scheduled via the DCI and a slot in which the UE is to transmit a physical uplink control channel (PUCCH) that carries acknowledgement/negative acknowledgement (ACK/NACK) feedback for the PDSCH. For example, as shown by reference number 316, the UE may be expected to receive a PDSCH in slot number 3 based on the value of the k0 parameter, and may transmit a PUCCH that carries ACK/NACK feedback for the PDSCH in slot number 8 based on the k1 parameter indicating a timing offset of five (5) slots from the slot in which the PDSCH is scheduled (e.g., slot number 3 in the illustrated example). In cases where a PDCCH contains a multi-PDSCH grant, the k1 parameter may be counted from the slot in which the last granted PDSCH is scheduled.

As shown in FIG. 3B, for an uplink communication (e.g., a PUSCH communication), the TDRA parameters may include, for example, a k2 value, an S value, and an L value. The k2 value may represent a timing offset (e.g., in number of slots) between a slot containing the scheduling DCI (carrying a grant that schedules the PUSCH communication) and a slot containing the scheduled PUSCH communication (scheduled via the scheduling DCI). For example, as shown in FIG. 3B, and by reference number 322, a UE may receive DCI scheduling a PUSCH in a PDCCH monitoring occasion of slot number 4, and a value of the k2 parameter may indicate the slot in which the UE can expect to receive the PUSCH scheduled via the DCI. For example, as shown in FIG. 3B, and by reference number 324, the UE may expect to receive the PUSCH in slot number 9 based on receiving the scheduling DCI in slot number 4 with the k2 parameter indicating a timing offset of five (5) slots. The S value may represent a starting symbol for the PUSCH communication in the indicated slot. The L value may represent a length (e.g., a number of consecutive symbols) of the PUSCH communication (e.g., in the indicated slot). In some aspects, the same row index value may correspond to a different set of TDRA parameters depending on, for example, a PUSCH mapping type (e.g., indicating a starting symbol of the DMRS, a length of the DMRS, and/or whether slot-based scheduling or mini-slot-based scheduling is used).

Accordingly, various timing offsets may be used in a wireless network to indicate a timing offset between a PDCCH, a PDSCH, a PUCCH, and/or a PUSCH. For example, as described above, a k0 parameter may indicate a timing offset (or slot offset) between a slot in which a PDCCH is received and a slot in which a PDSCH granted by the PDCCH is scheduled, a k1 parameter may indicate a timing offset between the slot in which the PDSCH is scheduled and a slot in which a UE is to transmit ACK/NACK feedback for the PDSCH, and/or a k2 parameter may indicate a timing offset between a slot in which a PDCCH is received and a slot in which a PUSCH granted by the PDCCH is scheduled. In general, the k0, k1, and/or k2 parameters may be determined based on a TDRA field in the scheduling DCI. For example, the TDRA field may have a value that indicates a row index in an RRC-configured TDRA table, and the indicated row index may include a value for the k0, k1, and/or k2 parameter (e.g., depending on whether the DCI schedules a PDSCH and/or a PUSCH).

However, in some cases, a UE may receive a PDCCH that schedules a PDSCH and/or a PUSCH before receiving an RRC configuration. In such cases, the UE may determine the value(s) of the k0, k1, and/or k2 parameters from a default set of values indicated in a default TDRA table. For example, in the PDSCH default TDRA table, the k0 parameter may have a value of zero (0) slots or one (1) slot, whereby the PDSCH is either scheduled in the same slot as the PDCCH or the next slot after the PDSCH, and the k1 parameter may have a value in a range from one (1) to eight (8) slots when carrying ACK/NACK feedback for a PDSCH scheduled via fallback DCI (e.g., DCI format 1_0). Alternatively, when a DCI format other than DCI format 1_0 schedules a PDSCH or a semi-persistent scheduling (SPS) release, the k1 parameter may be determined by a PDSCH-to-HARQ feedback timing indicator field in the scheduling DCI, which may map to a value for the k1 parameter that is provided by a configured parameter (e.g., dl-DataToUL-ACK, or dl-DataToUL-ACKForDCIFormat1_2 for DCI format 1_2) that can have a value in a range from zero (0) to fifteen (15). Furthermore, in the PUSCH default TDRA table, the k2 parameter may have a value of j, j+1, j+2, or j+3, where j is one (1) for a subcarrier spacing of 15 kilohertz (kHz), one (1) for a subcarrier spacing of 30 kHz, two (2) for a subcarrier spacing of 60 kHz, or three (3) for a subcarrier spacing of 120 kHz.

In general, the default timing offset values may cause challenges in higher frequency bands, such as frequencies in FR4 (e.g., from 52.6 GHz to 71 GHz), where a large subcarrier spacing (e.g., 480 kHz, 960 kHz, 1.9 MHz, 3.8 MHz, or higher) may be needed to support a larger bandwidth with the same Fast Fourier transform (FFT) size as lower frequency bands. For example, a higher subcarrier spacing is generally associated with a shorter slot duration (e.g., whereas a 15 kHz subcarrier spacing is associated with a 1 millisecond (ms) slot duration and a 30 kHz subcarrier spacing is associated with a 0.5 ms slot duration, a 480 kHz subcarrier spacing is associated with a slot duration of 31.25 microseconds (μs) and a 960 kHz subcarrier spacing is associated with a 15.625 μs slot duration. Accordingly, due to the very short slot durations, wireless communications that use a high subcarrier spacing (e.g., 480 kHz or higher) may support a multi-PDSCH and/or multi-PUSCH grant (e.g., where one DCI schedules multiple PDSCH and/or PUSCH communications) and/or multi-slot PDCCH monitoring (e.g., where the UE monitors a PDCCH occasion only once every M slots). Accordingly, with PDCCH grants scheduling downlink or uplink communications over multiple slots or transmission time intervals (TTIs), a base station may need to schedule a PDSCH or a PUSCH a larger number of slots away from the granting PDCCH than is permitted using the default TDRA tables. Furthermore, for multi-slot PDCCH monitoring, the base station should have a capability to schedule a PDSCH or PUSCH in any slot between adjacent monitoring occasions. However, as described above, the PDSCH default TDRA tables constrain PDSCH scheduling to the same slot or the next slot after the PDCCH, and the PUSCH default TDRA tables constrain PUSCH scheduling to be no more than six slots after the PDCCH (e.g., in cases where the k2 parameter has a value of j+3 and j=3 for a subcarrier spacing of 120 kHz).

Some aspects described herein relate to techniques and apparatuses to configure one or more timing offsets (e.g., a k0 parameter for a PDSCH, a k1 parameter for a PUCCH carrying ACK/NACK feedback for the PDSCH, or a k2 parameter for a PUSCH) based at least in part on a subcarrier spacing of the PDSCH or PUSCH. For example, as described herein, a default TDRA table may be configured (e.g., defined in a wireless communication standard) on different subcarrier spacings, and the default TDRA table that is configured for a higher subcarrier spacing (e.g., 480 kHz or higher) may have larger possible values for a k0 parameter and/or a k2 parameter. For example, in some aspects, a maximum k0 or k2 value in the default TDRA table for a given subcarrier spacing may be based on a default PDCCH monitoring periodicity defined for the subcarrier spacing. Additionally, or alternatively, the default TDRA table may cover all possible slot offsets between a minimum slot offset (e.g., zero for a PDSCH, or one or higher for a PUSCH) and M−1, where M is the number of slots between two adjacent PDCCH monitoring occasions. Furthermore, in some aspects, an RRC-configured TDRA table may include values for the k0 parameter and/or the k2 parameter based on the subcarrier spacing (e.g., allowing values larger than the existing maximum of thirty-two (32) to allow the base station to schedule a PDSCH or PUSCH farther away from the PDCCH and/or excluding lower values such as zero or one to ensure that the UE has adequate time to schedule reception and/or transmission of the PDSCH or PUSCH).

Furthermore, in some aspects, a k1 parameter that defines a timing offset between a PDSCH and a PUCCH that carries ACK/NACK feedback for the PDSCH may be associated with a range of values that is based on the subcarrier spacing (e.g., the range of values for the k1 parameter may be higher for higher subcarrier spacings). For example, in cases where a UE receives a PDCCH that carries fallback DCI (e.g., DCI format 1_0) to schedule a PDSCH, a default range (e.g., from 1 to 8) may be shifted according to a parameter having a constant value that may be based on the subcarrier spacing or a parameter related to a PDSCH decoding time (e.g., an N1 parameter that defines a number of OFDM symbols that a UE requires for processing from the end of PDSCH reception to the earliest possible start of the PUCCH carrying the ACK/NACK feedback). Alternatively, in some aspects, a default TDRA table may be defined with larger values that are based on the subcarrier spacing. Additionally, or alternatively, in cases where an RRC configuration indicates a table having a range of possible values for the k1 parameter, one or more entries in the table may be shifted (e.g., increased) based on the subcarrier spacing. In this way, the k1 parameter may have a maximum value that is larger than eight (8) when carrying ACK/NACK feedback for a PDSCH scheduled via fallback DCI or a maximum value larger than fifteen (15) when carrying ACK/NACK feedback for a PDSCH scheduled via non-fallback DCI, which may be especially useful at carrier frequencies having large subcarrier spacings (e.g., 480 kHz or higher).

As indicated above, FIGS. 3A-3B are provided as examples. Other examples may differ from what is described with regard to FIGS. 3A-3B.

Figure 4:
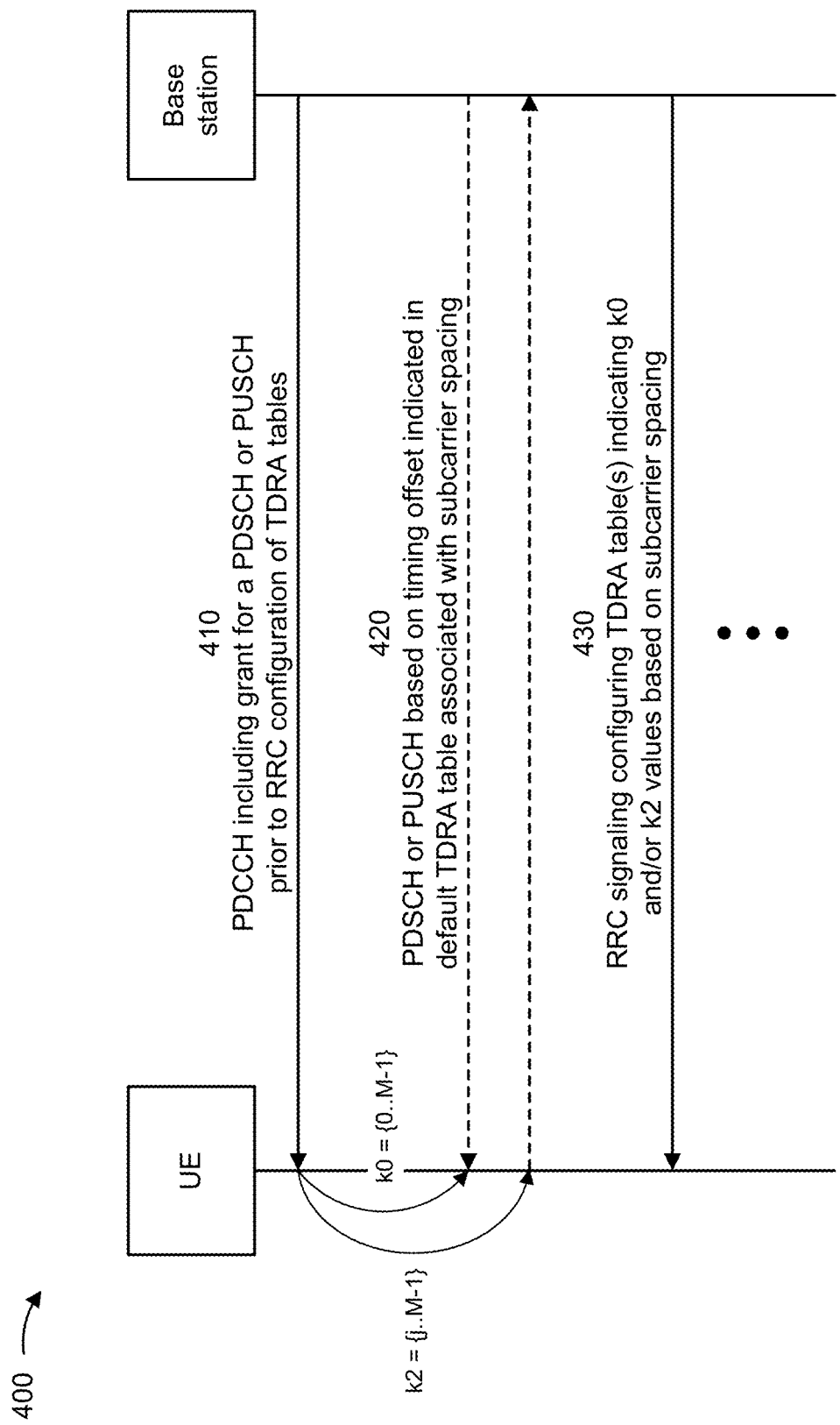
FIGS. 4-5 are diagrams illustrating examples associated with timing offset indications for higher frequency bands, in accordance with the present disclosure.

FIG. 4 is a diagram illustrating an example 400 associated with timing offset indications for higher frequency bands, in accordance with the present disclosure. As shown in FIG. 4, example 400 includes communication between a base station (e.g., base station 110) and a UE (e.g., UE 120). In some aspects, the base station and the UE may be included in a wireless network, such as wireless network 100. The base station and the UE may communicate via a wireless access link, which may include an uplink and a downlink. Furthermore, as described herein, the base station and the UE may communicate using a high frequency band (e.g., 52.6 GHz or higher), which may be associated with a large subcarrier spacing (e.g., 480 kHz or higher).

As shown in FIG. 4, and by reference number 410, the base station may transmit, and the UE may receive, a PDCCH that includes a grant to schedule a PDSCH or a PUSCH. For example, in some aspects, the PDCCH may carry downlink DCI (e.g., DCI format 1_0 or 1_1) that includes a downlink grant to schedule a PDSCH, or the PDCCH may carry uplink DCI (e.g., DCI format 0_0 or 0_1) that includes an uplink grant to schedule a PUSCH. In some aspects, the PDCCH may be received by the UE prior to the UE receiving an RRC configuration to indicate a timing offset between the PDCCH and the PDSCH or PUSCH scheduled via the PDCCH. Accordingly, as described herein, the UE and the base station may each determine a timing offset between the PDCCH and the communication scheduled via the PDCCH based on a default TDRA table. For example, the default TDRA table may indicate a default value for a k0 parameter in cases where the PDCCH schedules a PDSCH or a default value for a k2 parameter in cases where the PDCCH schedules a PUSCH. Furthermore, because the PDSCH or PUSCH may be scheduled on a frequency associated with a large subcarrier spacing, the default TDRA table used to determine the timing offset between the PDCCH and the PDSCH or PUSCH scheduled via the PDCCH may be associated with the subcarrier spacing (e.g., to account for the short slot duration associated with the subcarrier spacing, multi-slot PDCCH monitoring, and/or multi-PDSCH or multi-PUSCH scheduling, among other examples).

For example, in cases where the PDCCH schedules a PDSCH, the default TDRA table may indicate a value for a k0 parameter that defines a slot offset between a slot in which the PDCCH is received by the UE and a slot in which the PDSCH is scheduled. In some aspects, a default PDCCH monitoring periodicity may be defined for the subcarrier spacing associated with the PDSCH. For example, due to the short slot duration associated with a larger subcarrier spacing, the base station may need to schedule the PDSCH multiple slots after the PDCCH. Furthermore, to account for the short slot duration associated with a larger subcarrier spacing, a PDCCH monitoring occasion might not be provided in every slot. Accordingly, in some aspects, the default TDRA table used to determine the value of the k0 parameters may be specific to the subcarrier spacing associated with the PDSCH, and the TDRA table may include values larger than one (1) to account for the short slot duration as well as the possibility of the PDCCH scheduling multiple PDSCHs prior to a next PDCCH monitoring occasion.

Accordingly, in cases where the PDCCH is transmitted to schedule a PDSCH before the UE is provided with an RRC-configured TDRA table that indicates one or more values for the k0 parameter, the UE and the base station may determine the timing offset (e.g., the value of the k0 parameter) based on a default TDRA table that is associated with a subcarrier spacing for the PDSCH. For example, in the default TDRA table, a maximum value for the k0 parameter may be based on the default PDCCH monitoring periodicity that is defined for the subcarrier spacing (e.g., if a PDCCH monitoring occasion is configured for every eight (8) slots, the maximum value for the k0 parameter may be seven (7) to allow the base station to schedule the PDSCH in any slot between the current PDCCH monitoring occasion and the next PDCCH monitoring occasion). Accordingly, in some aspects, the default TDRA table used to determine the default value of the k0 parameter (e.g., prior to the UE receiving an RRC-configured TDRA table for a PDSCH) may cover all possible slot offsets from zero (0) to M−1, where M is the number of slots between adjacent PDCCH monitoring occasions for the subcarrier spacing associated with the PDSCH. Furthermore, in cases where the default value of the k0 parameter is greater than zero (0) (e.g., the PDSCH is not scheduled in the same slot as the PDCCH), the k0 parameter may be associated with a SLIV that covers a whole slot. In other words, in cases where the default value of the k0 parameter is one (1) or higher, the k0 parameter may be associated with an S value of zero (0) an L value of fourteen (14) to indicate that the PDSCH covers 14 consecutive symbols starting from the first symbol in the slot (e.g., the whole slot) because the PDSCH may be scheduled in a slot without a PDCCH monitoring occasion.

Alternatively, in cases where the PDCCH schedules a PUSCH, the default TDRA table may indicate a value for a k2 parameter that defines a slot offset between a slot in which the PDCCH is received by the UE and a slot in which the UE is to transmit the PUSCH. In some aspects, in a similar manner as described above, a default PDCCH monitoring periodicity may be defined for the subcarrier spacing associated with the PUSCH (e.g., a PDCCH monitoring occasion might not be provided in every slot to account for the short slot duration associated with a larger subcarrier spacing). Accordingly, in some aspects, the default TDRA table used to determine the value of the k2 parameters may be specific to the subcarrier spacing associated with the PUSCH, and the TDRA table may include values that are generally larger than the default k2 values used at lower subcarrier spacings (e.g., 240 kHz and below) to account for the short slot duration as well as the possibility of the PDCCH scheduling multiple PUSCHs prior to a next PDCCH monitoring occasion.

Accordingly, in cases where the PDCCH is transmitted to schedule a PUSCH before the UE is provided with an RRC-configured TDRA table that indicates one or more values for the k2 parameter, the UE and the base station may determine the timing offset (e.g., the value of the k2 parameter) based on a default TDRA table that is associated with a subcarrier spacing for the PUSCH. For example, in the default TDRA table, a maximum value for the k2 parameter may be based on the default PDCCH monitoring periodicity that is defined for the subcarrier spacing, and the default TDRA table indicating the default value of the k2 parameter may cover all slot offsets between j and M−1, where j is a minimum PUSCH slot offset for the subcarrier spacing and M is the number of slots between adjacent PDCCH monitoring occasions for the subcarrier spacing associated with the PUSCH. For example, as described above, the minimum PUSCH slot offset, j, may have a value of 1 for a subcarrier spacing of 15 or 30 kHz, 2 for a subcarrier spacing of 60 kHz, 3 for a subcarrier spacing of 120 kHz, or more than 3 for a subcarrier spacing of 480 kHz or higher. In this way, the default k2 value may be no less than the minimum PUSCH slot offset (e.g., to account for a downlink-to-uplink switching time and/or the slot duration), and the default TDRA table for a large subcarrier spacing (e.g., 480 kHz or higher) may have larger k2 values to enable the PUSCH to be scheduled in any slot prior to a next PDCCH monitoring occasion.

Accordingly, in cases where the base station transmits and the UE receives a PDCCH including a grant for a PDSCH or a PUSCH prior to an RRC configuration that indicates TDRA tables for the PDSCH or PUSCH, the UE and the base station may each determine a timing offset (e.g., a k0 value for a PDSCH or a k2 value for a PUSCH) based on a default TDRA table that is associated with the subcarrier spacing for the communication scheduled via the PDCCH. For example, the default TDRA tables that indicate the default k0 and k2 values for different subcarrier spacings may be indicated in a wireless communication standard or in configuration information provided to the UE prior to an RRC configuration (e.g., in system information and/or random access configuration information, among other examples). For example, as described above, the default TDRA tables may indicate maximum values for the k0 and k2 parameters that are based on the default PDCCH monitoring periodicity for the subcarrier spacing, and the default TDRA tables may indicate a minimum value of zero (0) for the k0 parameter or the minimum PUSCH slot offset for the k2 parameter.

Accordingly, as shown by reference number 420, the base station may transmit a PDSCH to the UE in a slot that is based on the default value of the k0 parameter, as indicated in the default TDRA table associated with the subcarrier spacing of the PDSCH. For example, as shown, the default value of the k0 parameter may have a value between 0 and M−1, where M is the number of slots between adjacent PDCCH monitoring occasions for the subcarrier spacing. Alternatively, in cases where the PDCCH schedules a PUSCH, the UE may transmit a PUSCH to the base station in a slot that is based on the default value of the k2 parameter, as indicated in the default TDRA table associated with the subcarrier spacing of the PUSCH. For example, as shown, the default value of the k2 parameter may have a value between j and M−1, where j is the minimum PUSCH slot offset and M is the number of slots between adjacent PDCCH monitoring occasions for the subcarrier spacing.

As further shown in FIG. 4, and by reference number 430, the base station may transmit, and the UE may receive, RRC signaling that configures one or more TDRA tables indicating k0 and/or k2 values based on a subcarrier spacing. In general, in existing wireless networks, RRC-configured TDRA tables may indicate k0 values and/or k2 values in a range from zero (0) to thirty-two (32). However, for the reasons discussed in further detail above, larger slot offsets may be useful when the base station and the UE communicate using a higher frequency band associated with a large subcarrier spacing, due to the short slot duration and/or less frequent PDCCH monitoring occasions. Accordingly, the RRC-configured TDRA tables may include a range of k0 values or k2 values that extends beyond 32 slots. For example, in an RRC-configured TDRA table for a large subcarrier spacing, a range of k0 values may be shifted such that the k0 parameter can have a maximum value larger than 32 (e.g., the range may span from 16 to 48 to preserve the TDRA table format that allows the k0 parameter to have a value in a range from 0 to 32, or the range may span from 0 to 48 to allow more flexibility in PDSCH scheduling). Additionally, or alternatively, to improve performance at large subcarrier spacings, same-slot PDSCH scheduling may be restricted at large subcarrier spacings (e.g., zero (0) may be an invalid value for the k0 parameter at a large subcarrier spacing). Furthermore, in some aspects, a similar approach may be applied for the k2 parameter, whereby a range of k2 values in the RRC-configured TDRA tables may span 32 slots starting from a minimum value that corresponds to the minimum PDCCH-to-PUSCH offset. In other words, to allow the k2 parameter to have a value larger than 32 slots, the 32-slot range of the k2 parameter may be shifted according to the minimum scheduling offset from a PDCCH to a PUSCH. Accordingly, when the base station transmits a subsequent PDCCH to schedule a subsequent PDSCH or PUSCH (e.g., after providing the RRC-configured TDRA tables), the value of the k0 or k2 parameter may be determined based on the TDRA field carried in the PDCCH.

As indicated above, FIG. 4 is provided as an example. Other examples may differ from what is described with regard to FIG. 4.

Figure 5:
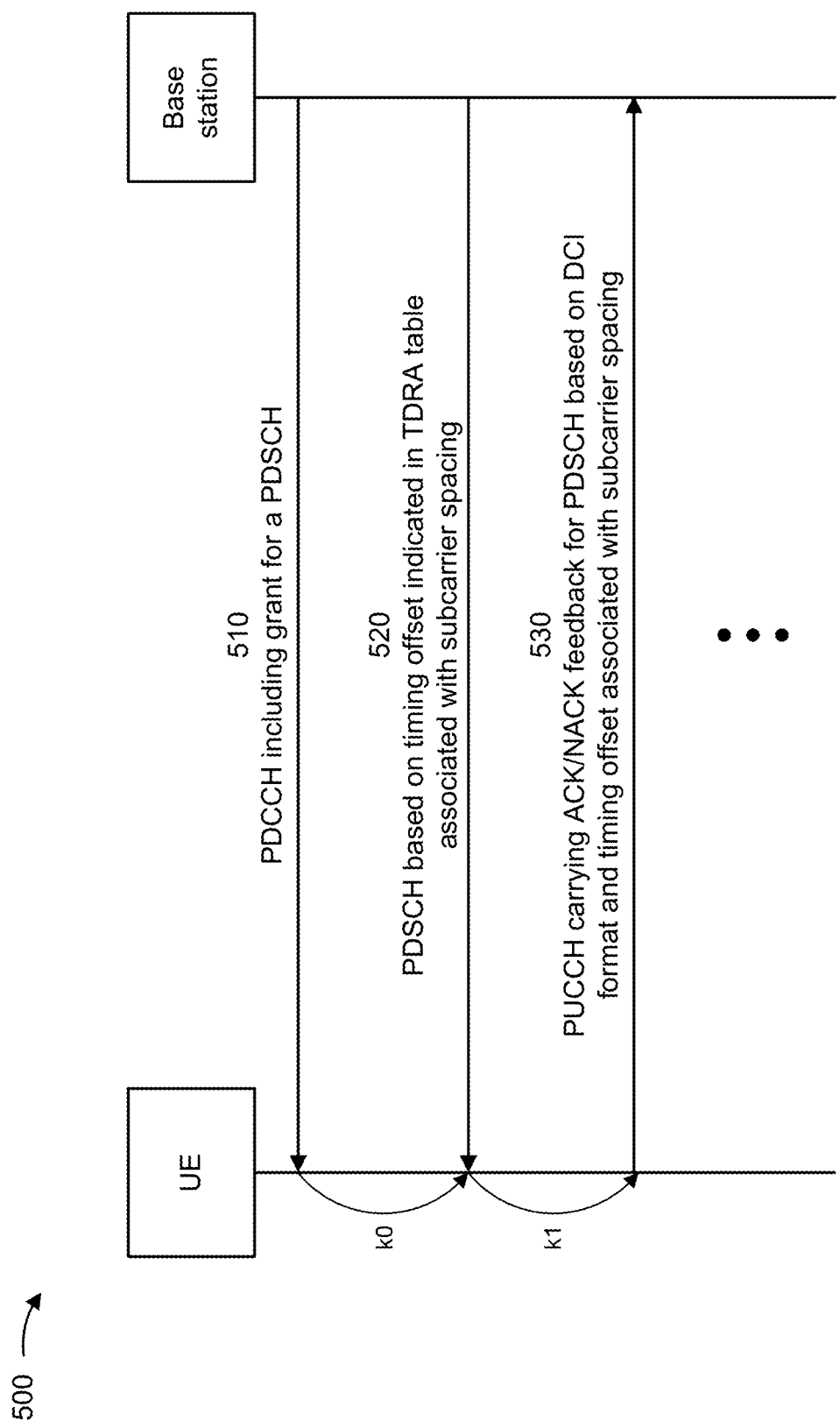

FIG. 5 is a diagram illustrating an example 500 associated with timing offset indications for higher frequency bands, in accordance with the present disclosure. As shown in FIG. 5, example 500 includes communication between a base station (e.g., base station 110) and a UE (e.g., UE 120). In some aspects, the base station and the UE may be included in a wireless network, such as wireless network 100. The base station and the UE may communicate via a wireless access link, which may include an uplink and a downlink. Furthermore, as described herein, the base station and the UE may communicate using a high frequency band (e.g., 52.6 GHz or higher), which may be associated with a large subcarrier spacing (e.g., 480 kHz or higher).

As shown in FIG. 5, and by reference number 510, the base station may transmit, and the UE may receive, a PDCCH that includes a grant to schedule a PDSCH. For example, in some aspects, the PDCCH may carry downlink DCI that includes a downlink grant to schedule the PDSCH. In some aspects, the PDSCH may be scheduled via fallback DCI (e.g., DCI format 1_0) in cases where the PDCCH is received prior to the base station transmitting, and the UE receiving, a dedicated RRC configuration to indicate a first timing offset (e.g., a k0 parameter) between the PDCCH and the PDSCH and/or a second timing offset (e.g., a k1 parameter) between the PDSCH scheduled via the PDCCH and a PUCCH that carries ACK/NACK feedback for the PDSCH. Alternatively, the PDSCH may be scheduled via non-fallback DCI (e.g., DCI format 1_1 or 1_2) in cases where the PDCCH is received after the base station transmits, and the UE receives, a dedicated RRC configuration to indicate the timing offset(s) between the PDCCH and the PDSCH and/or between the PDSCH and the PUCCH that carries ACK/NACK feedback for the PDSCH.

As further shown in FIG. 5, and by reference number 520, the base station may transmit a PDSCH to the UE in a slot that is based on a timing offset (e.g., a k0 parameter) that has a value indicated in a TDRA table associated with the subcarrier spacing of the PDSCH. For example, in cases where the PDSCH is scheduled via fallback DCI or prior to the UE receiving a dedicated RRC configuration, the timing offset may be based on the default value of the k0 parameter, as indicated in the default TDRA table associated with the subcarrier spacing of the PDSCH. For example, as described above, the default value of the k0 parameter may have a value between 0 and M−1, where M is the number of slots between adjacent PDCCH monitoring occasions for the subcarrier spacing. Alternatively, in cases where the PDSCH is scheduled via non-fallback DCI or after the UE has received a dedicated RRC configuration that configures one or more TDRA tables based on the subcarrier spacing, the RRC-configured TDRA table(s) may include a range of k0 values that extends beyond 32 slots. For example, in an RRC-configured TDRA table for a large subcarrier spacing, a range of k0 values may be shifted such that the k0 parameter can have a maximum value larger than 32 (e.g., the range may span from 16 to 48 to preserve the TDRA table format that allows the k0 parameter to have a value in a range from 0 to 32, or the range may span from 0 to 48 to allow more flexibility in PDSCH scheduling). Additionally, or alternatively, to improve performance at large subcarrier spacings, same-slot PDSCH scheduling may be restricted at large subcarrier spacings (e.g., zero (0) may be an invalid value for the k0 parameter at a large subcarrier spacing).

As further shown in FIG. 5, and by reference number 530, the UE may transmit, and the base station may receive, a PUCCH that carries ACK/NACK feedback for the PDSCH scheduled via the PDCCH. For example, in some aspects, the UE and the base station may determine the timing offset between the PDSCH (or the last PDSCH in the case of a multi-PDSCH grant) and the PUCCH that carries the ACK/NACK feedback based on the subcarrier spacing and the DCI format used to schedule the PDSCH. For example, in cases where the PDCCH carries fallback DCI (e.g., DCI having format 1_0), the fallback DCI may include a PDSCH-to-HARQ feedback timing indicator that has a value in a range between one to eight. Accordingly, to provide the UE with more time to decode the PDSCH transmission(s) before transmitting the ACK/NACK feedback when a large subcarrier spacing results in a short slot duration, the UE and the base station may determine that the value of the PDSCH-to-HARQ feedback timing indicator in the fallback DCI is shifted according to a parameter that has a constant value, K.

For example, in some aspects, the UE and the base station may determine that the value of the PDSCH-to-HARQ feedback timing indicator in the fallback DCI is shifted by adding K to the indicated value of the PDSCH-to-HARQ feedback timing indicator. Alternatively, in some aspects, the PDSCH-to-HARQ feedback timing indicator in the fallback DCI may be shifted by multiplying the indicated value of the PDSCH-to-HARQ feedback timing indicator by K. In some aspects, the value of K may depend on the subcarrier spacing (e.g., each subcarrier spacing may be associated with a K value). Additionally, or alternatively, the value of K may depend on a parameter that relates to a PDSCH decoding time. For example, in some aspects, the value of K may depend on an N1 parameter that indicates the minimum number of OFDM symbols that the UE requires to decode and process PDSCH data, starting from the end of downlink data reception to the earliest possible start of transmission of the PUCCH that carries the ACK/NACK feedback.

In some aspects, rather than shifting the value of the PDSCH-to-HARQ feedback timing indicator in the fallback DCI, the value of the timing offset for the k1 parameter may be indicated in a default TDRA table associated with the subcarrier spacing. For example, in some aspects, the default TDRA table that indicates the range of values for the k1 parameter for the subcarrier spacing may be explicitly defined in one or more wireless communication standards to handle cases where fallback DCI having DCI format 1_0 is used to schedule a PDSCH before a dedicated RRC configuration is provided to the UE. In some aspects, the base station may transmit a system information block (SIB) to indicate which configuration is to be used to determine the timing offset between the PDSCH and the PUCCH. For example, the SIB may indicate that the k1 parameter for the subcarrier spacing is to be determined by adding a constant value to the value of the PDSCH-to-HARQ feedback timing indicator in the fallback DCI, multiplying a constant value by the value of the PDSCH-to-HARQ feedback timing indicator in the fallback DCI, or identifying the value of the k1 parameter in a default TDRA table associated with the subcarrier spacing.

Alternatively, in cases where the PDSCH is scheduled via non-fallback DCI, the base station may have previously transmitted a dedicated RRC configuration that includes a table to indicate a range of values for the k1 parameter. In such cases, for a non-fallback DCI scheduling the PDSCH, the value of the k1 parameter may be determined by applying a shift to one or more entries in the RRC-configured table to define the range that is based on the subcarrier spacing. For example, in some aspects, the range indicated in the RRC-configured table may be shifted by adding or multiplying the value(s) in one or more entries of the table by a configured value, which may be RRC-configured or hard-coded (e.g., defined in a wireless communication standard). However, in such cases, applying the shift to the entries in the RRC-configured table may result in excluding one or more smaller values for the k1 parameter, which may be needed for ultra-reliable low-latency communication (URLLC) traffic. Accordingly, in some aspects, the shift may be applied to only some of the entries in the RRC-configured table (e.g., the RRC-configured table may include one or more entries to which the shift is not applied). For example, the shift may be applied starting from an $N^{th}$ entry in the RRC-configured table, where N has a value greater than one (1) to ensure that the RRC-configured table includes at least one entry having a small value for the k1 parameter to enable the UE to transmit the PUCCH sooner (e.g., to support a latency requirement of URLLC traffic).

As indicated above, FIG. 5 is provided as an example. Other examples may differ from what is described with regard to FIG. 5.

Figure 6:
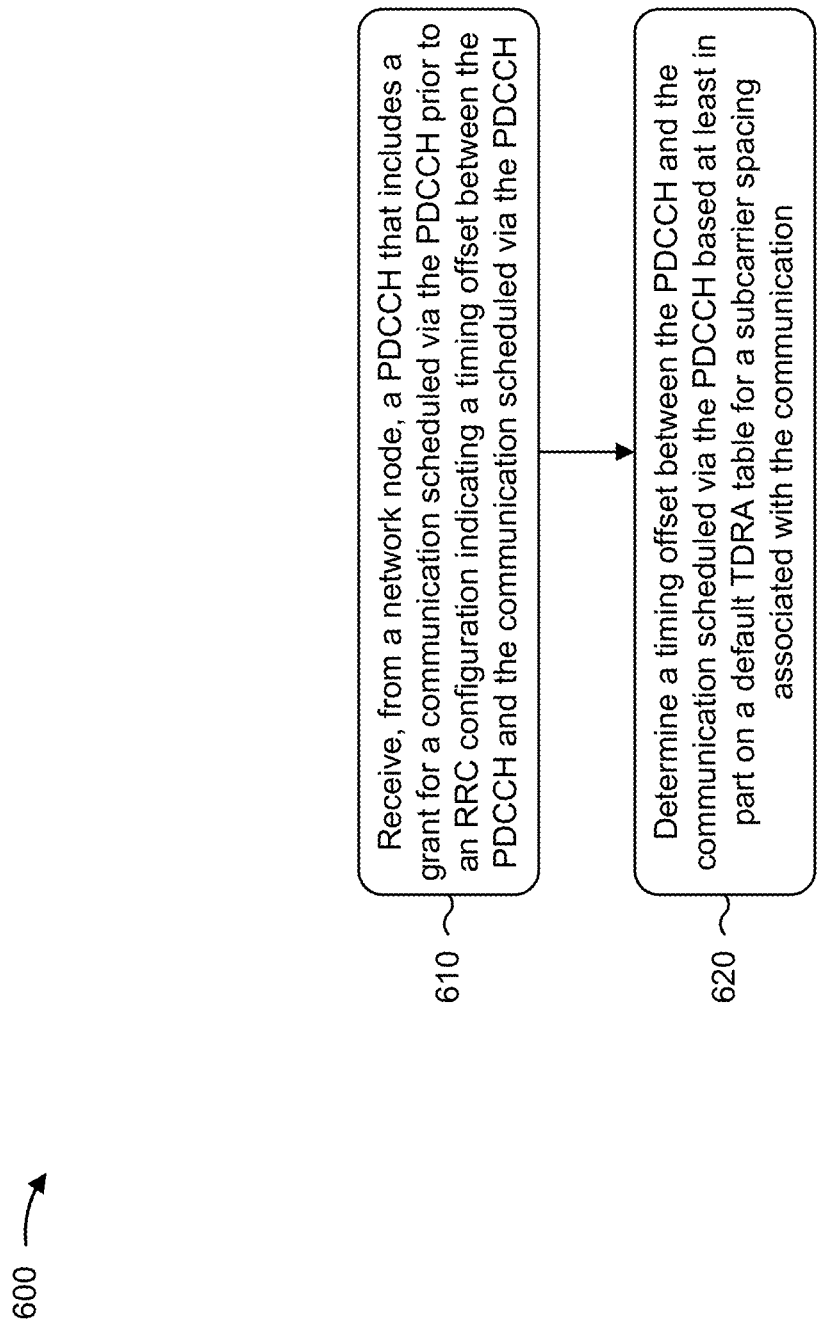
FIGS. 6-9 are diagrams illustrating example processes associated with timing offset indications for higher frequency bands, in accordance with the present disclosure.

FIG. 6 is a diagram illustrating an example process 600 performed, for example, by a UE, in accordance with the present disclosure. Example process 600 is an example where the UE (e.g., UE 120) performs operations associated with timing offset indications for higher frequency bands.

As shown in FIG. 6, in some aspects, process 600 may include receiving, from a network node, a PDCCH that includes a grant for a communication scheduled via the PDCCH prior to an RRC configuration indicating a timing offset between the PDCCH and the communication scheduled via the PDCCH (block 610). For example, the UE (e.g., using reception component 1002, depicted in FIG. 10) may receive, from a network node, a PDCCH that includes a grant for a communication scheduled via the PDCCH prior to an RRC configuration indicating a timing offset between the PDCCH and the communication scheduled via the PDCCH, as described above.

As further shown in FIG. 6, in some aspects, process 600 may include determining a timing offset between the PDCCH and the communication scheduled via the PDCCH based at least in part on a default TDRA table for a subcarrier spacing associated with the communication (block 620). For example, the UE (e.g., using determination component 1008, depicted in FIG. 10) may determine a timing offset between the PDCCH and the communication scheduled via the PDCCH based at least in part on a default TDRA table for a subcarrier spacing associated with the communication, as described above.

Process 600 may include additional aspects, such as any single aspect or any combination of aspects described below and/or in connection with one or more other processes described elsewhere herein.

In a first aspect, the timing offset includes a k0 parameter based at least in part on the communication including a PDSCH.

In a second aspect, alone or in combination with the first aspect, the timing offset is associated with a SLIV that covers a whole slot based at least in part on the k0 parameter having a value greater than zero.

In a third aspect, alone or in combination with one or more of the first and second aspects, the timing offset includes a k2 parameter based at least in part on the communication including a PUSCH.

In a fourth aspect, alone or in combination with one or more of the first through third aspects, the default TDRA table indicates a maximum value for the timing offset that is based at least in part on a default PDCCH monitoring periodicity defined for the subcarrier spacing associated with the communication.

In a fifth aspect, alone or in combination with one or more of the first through fourth aspects, the default TDRA table indicates one or more timing offset values in a range that covers all slot offsets between a minimum value for the timing offset and the maximum value for the timing offset.

In a sixth aspect, alone or in combination with one or more of the first through fifth aspects, the maximum value for the timing offset is one less than a number of slots between adjacent PDCCH monitoring occasions.

In a seventh aspect, alone or in combination with one or more of the first through sixth aspects, process 600 includes receiving an RRC configuration that includes a table indicating a range of timing offset values between a subsequent PDCCH and a subsequent communication scheduled via the subsequent PDCCH, wherein the range of timing offset values indicated in the table is based at least in part on the subcarrier spacing.

In an eighth aspect, alone or in combination with one or more of the first through seventh aspects, a minimum timing offset value in the range of timing offset values is greater than zero based at least in part on the subsequent communication including a PDSCH.

In a ninth aspect, alone or in combination with one or more of the first through eighth aspects, a maximum timing offset value in the range of timing offset values is greater than thirty-two.

In a tenth aspect, alone or in combination with one or more of the first through ninth aspects, a minimum timing offset value in the range of timing offset values is defined according to a shift that is based at least in part on a minimum scheduling offset associated with the subcarrier spacing.

In an eleventh aspect, alone or in combination with one or more of the first through tenth aspects, the subcarrier spacing is at least 480 kHz.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
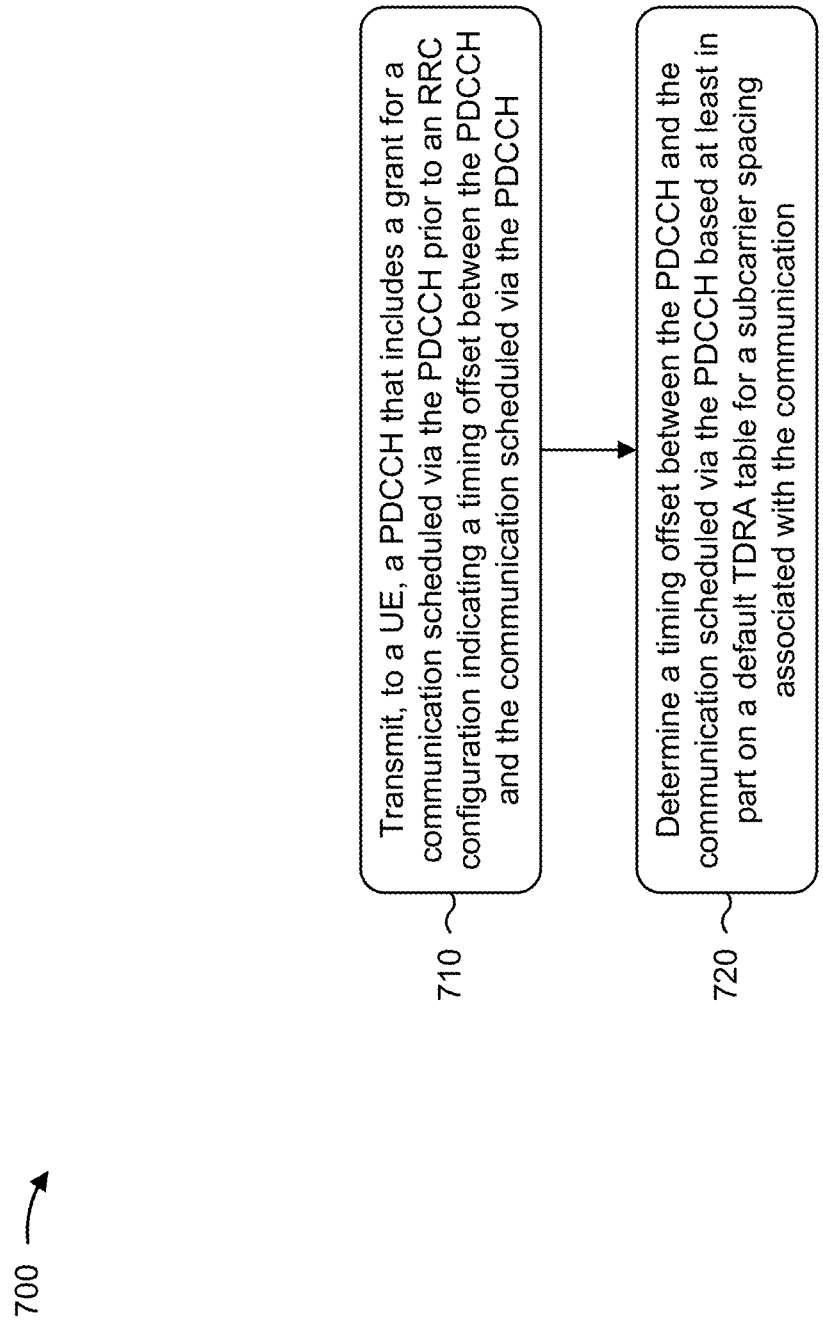

FIG. 7 is a diagram illustrating an example process 700 performed, for example, by a network node, in accordance with the present disclosure. Example process 700 is an example where the network node (e.g., base station 110) performs operations associated with timing offset indications for higher frequency bands.

As shown in FIG. 7, in some aspects, process 700 may include transmitting, to a UE, a PDCCH that includes a grant for a communication scheduled via the PDCCH prior to an RRC configuration indicating a timing offset between the PDCCH and the communication scheduled via the PDCCH (block 710). For example, the network node (e.g., using transmission component 1104, depicted in FIG. 11) may transmit, to a UE, a PDCCH that includes a grant for a communication scheduled via the PDCCH prior to an RRC configuration indicating a timing offset between the PDCCH and the communication scheduled via the PDCCH, as described above.

As further shown in FIG. 7, in some aspects, process 700 may include determining a timing offset between the PDCCH and the communication scheduled via the PDCCH based at least in part on a default TDRA table for a subcarrier spacing associated with the communication (block 720). For example, the network node (e.g., using determination component 1108, depicted in FIG. 11) may determine a timing offset between the PDCCH and the communication scheduled via the PDCCH based at least in part on a default TDRA table for a subcarrier spacing associated with the communication, as described above.

Process 700 may include additional aspects, such as any single aspect or any combination of aspects described below and/or in connection with one or more other processes described elsewhere herein.

In a first aspect, the timing offset includes a k0 parameter based at least in part on the communication including a PDSCH.

In a second aspect, alone or in combination with the first aspect, the timing offset is associated with a SLIV that covers a whole slot based at least in part on the k0 parameter having a value greater than zero.

In a third aspect, alone or in combination with one or more of the first and second aspects, the timing offset includes a k2 parameter based at least in part on the communication including a PUSCH.

In a fourth aspect, alone or in combination with one or more of the first through third aspects, the default TDRA table indicates a maximum value for the timing offset that is based at least in part on a default PDCCH monitoring periodicity defined for the subcarrier spacing associated with the communication.

In a fifth aspect, alone or in combination with one or more of the first through fourth aspects, the default TDRA table indicates one or more timing offset values in a range that covers all slot offsets between a minimum value for the timing offset and the maximum value for the timing offset.

In a sixth aspect, alone or in combination with one or more of the first through fifth aspects, the maximum value for the timing offset is one less than a number of slots between adjacent PDCCH monitoring occasions.

In a seventh aspect, alone or in combination with one or more of the first through sixth aspects, process 700 includes transmitting, to the UE, an RRC configuration that includes a table indicating a range of timing offset values between a subsequent PDCCH and a subsequent communication scheduled via the subsequent PDCCH, wherein the range of timing offset values indicated in the table is based at least in part on the subcarrier spacing.

In an eighth aspect, alone or in combination with one or more of the first through seventh aspects, a minimum timing offset value in the range of timing offset values is greater than zero based at least in part on the subsequent communication including a PDSCH.

In a ninth aspect, alone or in combination with one or more of the first through eighth aspects, a maximum timing offset value in the range of timing offset values is greater than thirty-two.

In a tenth aspect, alone or in combination with one or more of the first through ninth aspects, a minimum timing offset value in the range of timing offset values is defined according to a shift that is based at least in part on a minimum scheduling offset associated with the subcarrier spacing.

In an eleventh aspect, alone or in combination with one or more of the first through tenth aspects, the subcarrier spacing is at least 480 kHz.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
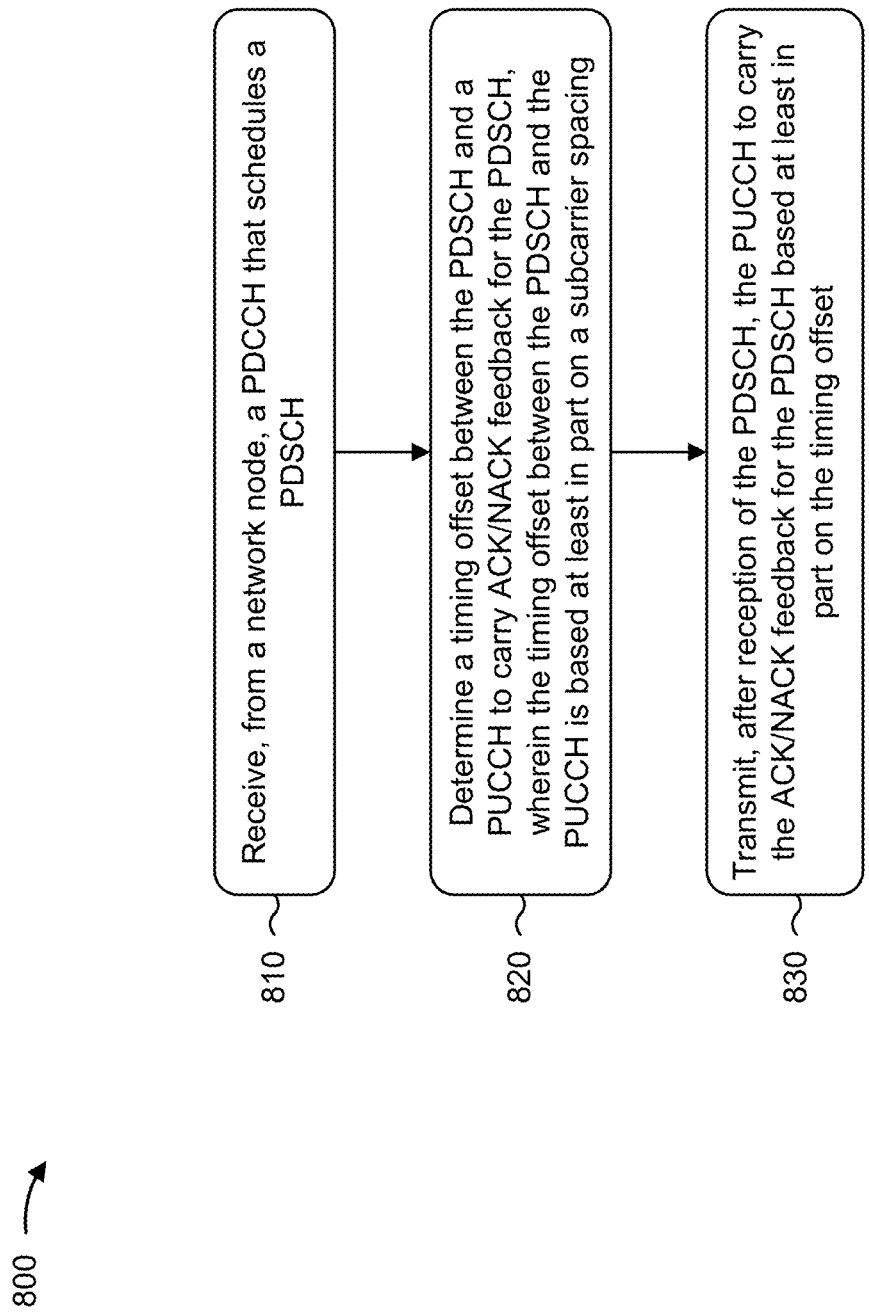

FIG. 8 is a diagram illustrating an example process 800 performed, for example, by a UE, in accordance with the present disclosure. Example process 800 is an example where the UE (e.g., UE 120) performs operations associated with timing offset indications for higher frequency bands.

As shown in FIG. 8, in some aspects, process 800 may include receiving, from a network node, a PDCCH that schedules a PDSCH (block 810). For example, the UE (e.g., using reception component 1002, depicted in FIG. 10) may receive, from a network node, a PDCCH that schedules a PDSCH, as described above.

As further shown in FIG. 8, in some aspects, process 800 may include determining a timing offset between the PDSCH and a PUCCH to carry ACK/NACK feedback for the PDSCH, wherein the timing offset between the PDSCH and the PUCCH is based at least in part on a subcarrier spacing (block 820). For example, the UE (e.g., using determination component 1008, depicted in FIG. 10) may determine a timing offset between the PDSCH and a PUCCH to carry ACK/NACK feedback for the PDSCH, wherein the timing offset between the PDSCH and the PUCCH is based at least in part on a subcarrier spacing, as described above.

As further shown in FIG. 8, in some aspects, process 800 may include transmitting, after reception of the PDSCH, the PUCCH to carry the ACK/NACK feedback for the PDSCH based at least in part on the timing offset (block 830). For example, the UE (e.g., using transmission component 1004, depicted in FIG. 10) may transmit, after reception of the PDSCH, the PUCCH to carry the ACK/NACK feedback for the PDSCH based at least in part on the timing offset, as described above.

Process 800 may include additional aspects, such as any single aspect or any combination of aspects described below and/or in connection with one or more other processes described elsewhere herein.

In a first aspect, determining the timing offset between the PDSCH and the PUCCH includes determining that fallback DCI carried in the PDCCH includes an indicated value for the timing offset in a default range, and shifting the indicated value for the timing offset based at least in part on a parameter having a constant value.

In a second aspect, alone or in combination with the first aspect, the indicated value for the timing offset is shifted by adding the constant value and the indicated value for the timing offset.

In a third aspect, alone or in combination with one or more of the first and second aspects, the indicated value for the timing offset is shifted by multiplying the constant value and the indicated value for the timing offset.

In a fourth aspect, alone or in combination with one or more of the first through third aspects, the constant value is based at least in part on the subcarrier spacing.

In a fifth aspect, alone or in combination with one or more of the first through fourth aspects, the constant value is based at least in part on a decoding time associated with the PDSCH.

In a sixth aspect, alone or in combination with one or more of the first through fifth aspects, the timing offset between the PDSCH and the PUCCH is indicated in a default TDRA table associated with the subcarrier spacing.

In a seventh aspect, alone or in combination with one or more of the first through sixth aspects, process 800 includes receiving, from the network node, a SIB that indicates a configuration for determining the timing offset, wherein the timing offset is determined using the configuration indicated in the SIB based at least in part on the PDCCH carrying downlink control information having a fallback format.

In an eighth aspect, alone or in combination with one or more of the first through seventh aspects, determining the timing offset between the PDSCH and the PUCCH includes determining that non-fallback DCI carried in the PDCCH includes an indicated value for the timing offset in a range that is based at least in part on the subcarrier spacing.

In a ninth aspect, alone or in combination with one or more of the first through eighth aspects, process 800 includes receiving an RRC configuration that includes a table indicating a range of timing offset values between the PDSCH and the PUCCH, and applying a shift to one or more entries in the table to define the range that is based at least in part on the subcarrier spacing.

In a tenth aspect, alone or in combination with one or more of the first through ninth aspects, the table includes one or more entries that indicate timing offset values to which the shift is not applied.

In an eleventh aspect, alone or in combination with one or more of the first through tenth aspects, the timing offset has a maximum value greater than eight slots based at least in part on the PDCCH carrying DCI having a fallback format.

In a twelfth aspect, alone or in combination with one or more of the first through eleventh aspects, the timing offset has a maximum value greater than fifteen slots based at least in part on the PDCCH carrying DCI having a non-fallback format.

In a thirteenth aspect, alone or in combination with one or more of the first through twelfth aspects, the subcarrier spacing is at least 480 kHz.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
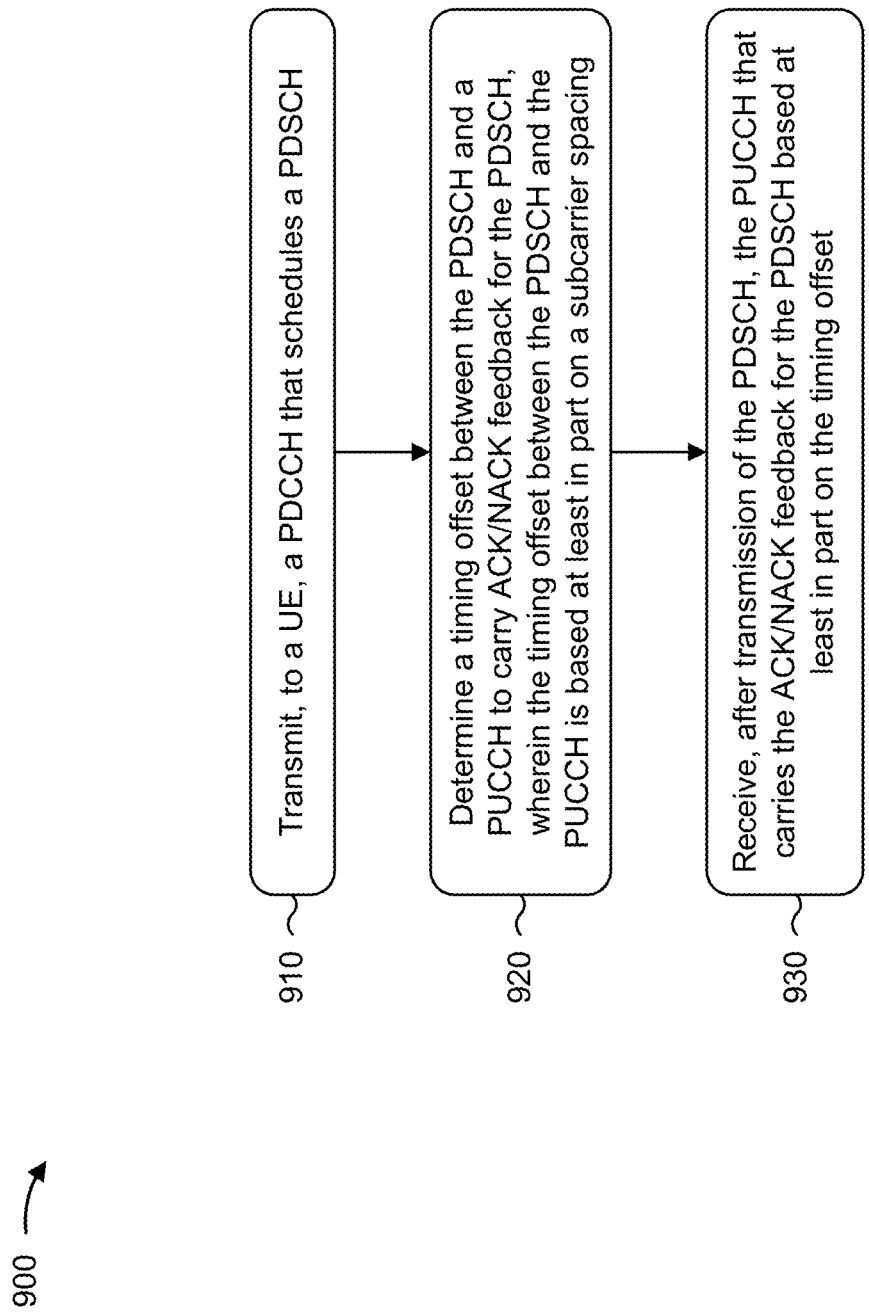

FIG. 9 is a diagram illustrating an example process 900 performed, for example, by a network node, in accordance with the present disclosure. Example process 900 is an example where the network node (e.g., base station 110) performs operations associated with timing offset indications for higher frequency bands.

As shown in FIG. 9, in some aspects, process 900 may include transmitting, to a UE, a PDCCH that schedules a PDSCH (block 910). For example, the network node (e.g., using transmission component 1104, depicted in FIG. 11) may transmit, to a UE, a PDCCH that schedules a PDSCH, as described above.

As further shown in FIG. 9, in some aspects, process 900 may include determining a timing offset between the PDSCH and a PUCCH to carry ACK/NACK feedback for the PDSCH, wherein the timing offset between the PDSCH and the PUCCH is based at least in part on a subcarrier spacing (block 920). For example, the network node (e.g., using determination component 1108, depicted in FIG. 11) may determine a timing offset between the PDSCH and a PUCCH to carry ACK/NACK feedback for the PDSCH, wherein the timing offset between the PDSCH and the PUCCH is based at least in part on a subcarrier spacing, as described above.

As further shown in FIG. 9, in some aspects, process 900 may include receiving, after transmission of the PDSCH, the PUCCH that carries ACK/NACK feedback for the PDSCH based at least in part on the timing offset (block 930). For example, the network node (e.g., using reception component 1102, depicted in FIG. 11) may receive, after transmission of the PDSCH, the PUCCH that carries ACK/NACK feedback for the PDSCH based at least in part on the timing offset, as described above.

Process 900 may include additional aspects, such as any single aspect or any combination of aspects described below and/or in connection with one or more other processes described elsewhere herein.

In a first aspect, the PDCCH carries fallback DCI that includes an indicated value for the timing offset in a default range, and the indicated value for the timing offset is shifted based at least in part on a parameter having a constant value.

In a second aspect, alone or in combination with the first aspect, the indicated value for the timing offset is shifted by adding the constant value and the indicated value for the timing offset.

In a third aspect, alone or in combination with one or more of the first and second aspects, the indicated value for the timing offset is shifted by multiplying the constant value and the indicated value for the timing offset.

In a fourth aspect, alone or in combination with one or more of the first through third aspects, the constant value is based at least in part on the subcarrier spacing.

In a fifth aspect, alone or in combination with one or more of the first through fourth aspects, the constant value is based at least in part on a decoding time associated with the PDSCH.

In a sixth aspect, alone or in combination with one or more of the first through fifth aspects, the timing offset between the PDSCH and the PUCCH is indicated in a default TDRA table associated with the subcarrier spacing.

In a seventh aspect, alone or in combination with one or more of the first through sixth aspects, process 900 includes transmitting, to the UE, a SIB that indicates a configuration for determining the timing offset, wherein the timing offset is determined using the configuration indicated in the SIB based at least in part on the PDCCH carrying DCI having a fallback format.

In an eighth aspect, alone or in combination with one or more of the first through seventh aspects, the PDCCH carries non-fallback DCI that includes an indicated value for the timing offset in a range that is based at least in part on the subcarrier spacing.

In a ninth aspect, alone or in combination with one or more of the first through eighth aspects, process 900 includes transmitting, to the UE, an RRC configuration that includes a table indicating a range of timing offset values between the PDSCH and the PUCCH, and applying a shift to one or more entries in the table to define the range that is based at least in part on the subcarrier spacing.

In a tenth aspect, alone or in combination with one or more of the first through ninth aspects, the table includes one or more entries that indicate timing offset values to which the shift is not applied.

In an eleventh aspect, alone or in combination with one or more of the first through tenth aspects, the timing offset has a maximum value greater than eight slots based at least in part on the PDCCH carrying DCI having a fallback format.

In a twelfth aspect, alone or in combination with one or more of the first through eleventh aspects, the timing offset has a maximum value greater than fifteen slots based at least in part on the PDCCH carrying DCI having a non-fallback format.

In a thirteenth aspect, alone or in combination with one or more of the first through twelfth aspects, the subcarrier spacing is at least 480 kHz.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
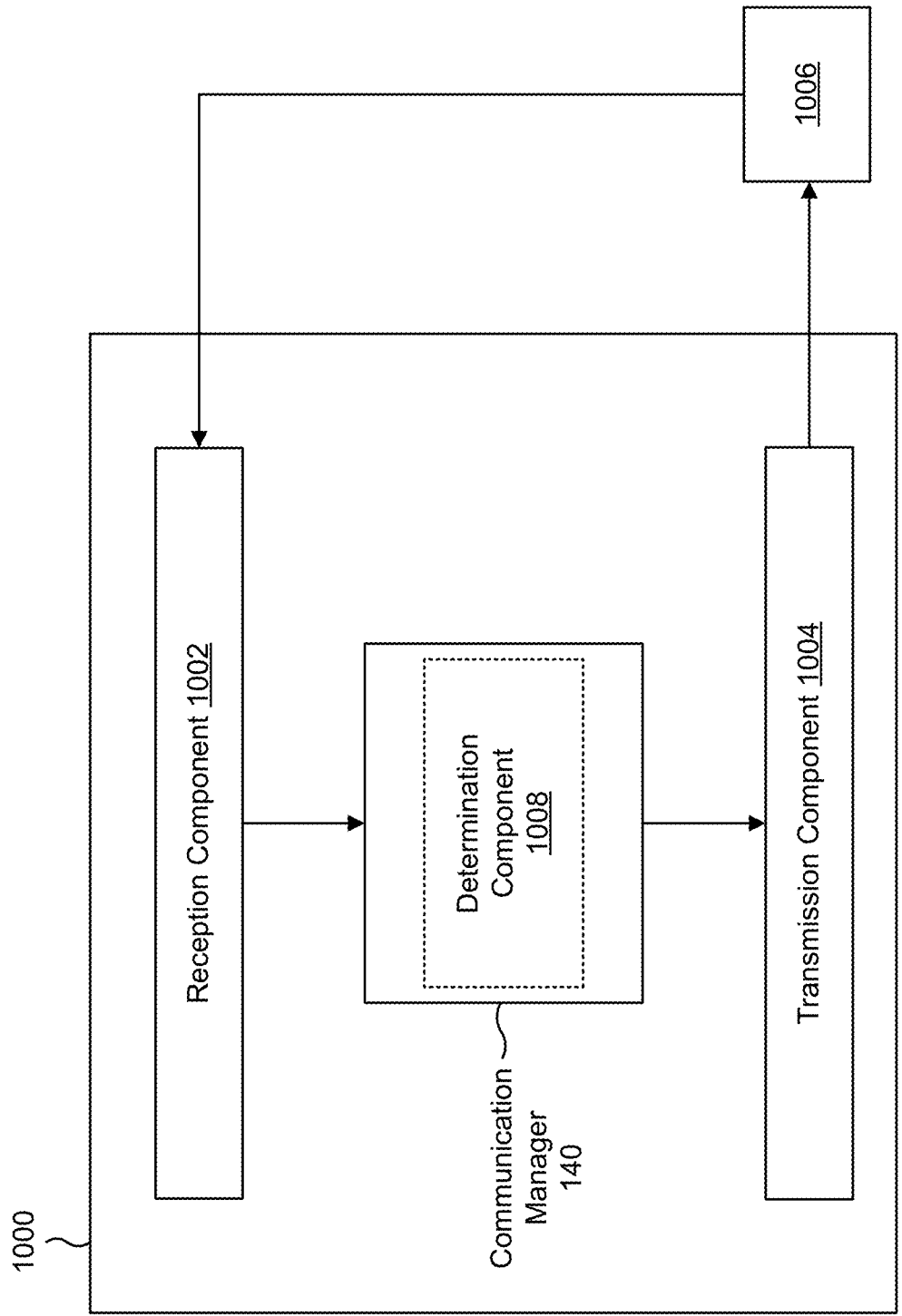
FIGS. 10-11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 140. The communication manager 140 may include a determination component 1008, among other examples.

In some aspects, the apparatus 1000 may be configured to perform one or more operations described herein in connection with FIG. 4 and/or FIG. 5. Additionally, or alternatively, the apparatus 1000 may be configured to perform one or more processes described herein, such as process 600 of FIG. 6, process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive, from a network node, a PDCCH that includes a grant for a communication scheduled via the PDCCH prior to an RRC configuration indicating a timing offset between the PDCCH and the communication scheduled via the PDCCH. The determination component 1008 may determine a timing offset between the PDCCH and the communication scheduled via the PDCCH based at least in part on a default TDRA table for a subcarrier spacing associated with the communication.

The reception component 1002 may receive an RRC configuration that includes a table indicating a range of timing offset values between a subsequent PDCCH and a subsequent communication scheduled via the subsequent PDCCH, wherein the range of timing offset values indicated in the table is based at least in part on the subcarrier spacing.

The reception component 1002 may receive, from a network node, a PDCCH that schedules a PDSCH. The determination component 1008 may determine a timing offset between the PDSCH and a PUCCH to carry ACK/NACK feedback for the PDSCH, wherein the timing offset between the PDSCH and the PUCCH is based at least in part on a subcarrier spacing. The transmission component 1004 may transmit, after reception of the PDSCH, the PUCCH to carry the ACK/NACK feedback for the PDSCH based at least in part on the timing offset.

The reception component 1002 may receive, from the network node, a SIB that indicates a configuration for determining the timing offset, wherein the timing offset is determined using the configuration indicated in the SIB based at least in part on the PDCCH carrying downlink control information having a fallback format.

The reception component 1002 may receive an RRC configuration that includes a table indicating a range of timing offset values between the PDSCH and the PUCCH. The determination component 1008 may apply a shift to one or more entries in the table to define the range that is based at least in part on the subcarrier spacing.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
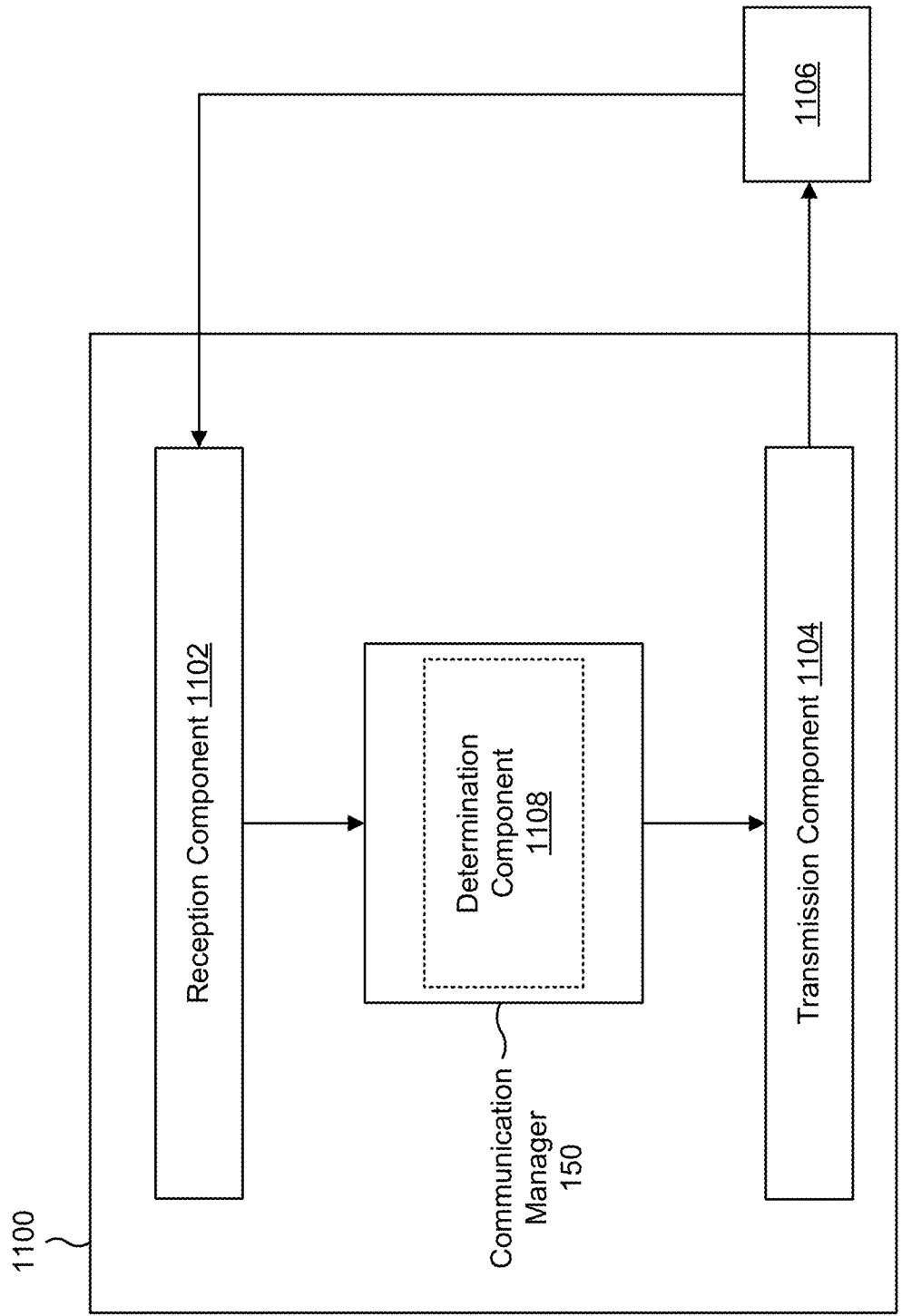

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 140 may include a determination component 1108, among other examples.

In some aspects, the apparatus 1100 may be configured to perform one or more operations described herein in connection with FIG. 4 and/or FIG. 5. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The transmission component 1104 may transmit, to a UE, a PDCCH that includes a grant for a communication scheduled via the PDCCH prior to an RRC configuration indicating a timing offset between the PDCCH and the communication scheduled via the PDCCH. The determination component 1108 may determine a timing offset between the PDCCH and the communication scheduled via the PDCCH based at least in part on a default TDRA table for a subcarrier spacing associated with the communication.

The transmission component 1104 may transmit, to the UE, an RRC configuration that includes a table indicating a range of timing offset values between a subsequent PDCCH and a subsequent communication scheduled via the subsequent PDCCH, wherein the range of timing offset values indicated in the table is based at least in part on the subcarrier spacing.

The transmission component 1104 may transmit, to a UE, a PDCCH that schedules a PDSCH. The determination component 1008 may determine a timing offset between the PDSCH and a PUCCH to carry ACK/NACK feedback for the PDSCH, wherein the timing offset between the PDSCH and the PUCCH is based at least in part on a subcarrier spacing. The reception component 102 may receive, after reception of the PDSCH, the PUCCH to carry the ACK/NACK feedback for the PDSCH based at least in part on the timing offset.

The transmission component 1104 may transmit, to the UE, a SIB that indicates a configuration for determining the timing offset, wherein the timing offset is determined using the configuration indicated in the SIB based at least in part on the PDCCH carrying downlink control information having a fallback format.

The transmission component 1104 may transmit, to the UE, an RRC configuration that includes a table indicating a range of timing offset values between the PDSCH and the PUCCH. The determination component 1008 may apply a shift to one or more entries in the table to define the range that is based at least in part on the subcarrier spacing.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving, from a network node, a PDCCH that includes a grant for a communication scheduled via the PDCCH prior to an RRC configuration indicating a timing offset between the PDCCH and the communication scheduled via the PDCCH; and determining a timing offset between the PDCCH and the communication scheduled via the PDCCH based at least in part on a default TDRA table for a subcarrier spacing associated with the communication.

Aspect 2: The method of Aspect 1, wherein the timing offset includes a k0 parameter based at least in part on the communication including a PDSCH.

Aspect 3: The method of Aspect 2, wherein the timing offset is associated with a SLIV that covers a whole slot based at least in part on the k0 parameter having a value greater than zero.

Aspect 4: The method of Aspect 1, wherein the timing offset includes a k2 parameter based at least in part on the communication including a PUSCH.

Aspect 5: The method of any of Aspects 1-4, wherein the default TDRA table indicates a maximum value for the timing offset that is based at least in part on a default PDCCH monitoring periodicity defined for the subcarrier spacing associated with the communication.

Aspect 6: The method of Aspect 5, wherein the default TDRA table indicates one or more timing offset values in a range that covers all slot offsets between a minimum value for the timing offset and the maximum value for the timing offset.

Aspect 7: The method of any of Aspects 5-6, wherein the maximum value for the timing offset is one less than a number of slots between adjacent PDCCH monitoring occasions.

Aspect 8: The method of any of Aspects 1-7, further comprising: receiving an RRC configuration that includes a table indicating a range of timing offset values between a subsequent PDCCH and a subsequent communication scheduled via the subsequent PDCCH, wherein the range of timing offset values indicated in the table is based at least in part on the subcarrier spacing.

Aspect 9: The method of Aspect 8, wherein a minimum timing offset value in the range of timing offset values is greater than zero based at least in part on the subsequent communication including a PDSCH.

Aspect 10: The method of any of Aspects 8-9, wherein a maximum timing offset value in the range of timing offset values is greater than thirty-two.

Aspect 11: The method of Aspect 10, wherein a minimum timing offset value in the range of timing offset values is defined according to a shift that is based at least in part on a minimum scheduling offset associated with the subcarrier spacing.

Aspect 12: The method of any of Aspects 1-11, wherein the subcarrier spacing is at least 480 kHz.

Aspect 13: A method of wireless communication performed by a network node, comprising: transmitting, to a UE, a PDCCH that includes a grant for a communication scheduled via the PDCCH prior to an RRC configuration indicating a timing offset between the PDCCH and the communication scheduled via the PDCCH; and determining a timing offset between the PDCCH and the communication scheduled via the PDCCH based at least in part on a default TDRA table for a subcarrier spacing associated with the communication.

Aspect 14: The method of Aspect 13, wherein the timing offset includes a k0 parameter based at least in part on the communication including a PDSCH.

Aspect 15: The method of Aspect 14, wherein the timing offset is associated with a SLIV that covers a whole slot based at least in part on the k0 parameter having a value greater than zero.

Aspect 16: The method of Aspect 13, wherein the timing offset includes a k2 parameter based at least in part on the communication including a PUSCH.

Aspect 17: The method of any of Aspects 13-16, wherein the default TDRA table indicates a maximum value for the timing offset that is based at least in part on a default PDCCH monitoring periodicity defined for the subcarrier spacing associated with the communication.

Aspect 18: The method of Aspect 17, wherein the default TDRA table indicates one or more timing offset values in a range that covers all slot offsets between a minimum value for the timing offset and the maximum value for the timing offset.

Aspect 19: The method of any of Aspects 17-18, wherein the maximum value for the timing offset is one less than a number of slots between adjacent PDCCH monitoring occasions.

Aspect 20: The method of any of Aspects 13-19, further comprising: transmitting, to the UE, an RRC configuration that includes a table indicating a range of timing offset values between a subsequent PDCCH and a subsequent communication scheduled via the subsequent PDCCH, wherein the range of timing offset values indicated in the table is based at least in part on the subcarrier spacing.

Aspect 21: The method of Aspect 20, wherein a minimum timing offset value in the range of timing offset values is greater than zero based at least in part on the subsequent communication including a PDSCH.

Aspect 22: The method of any of Aspects 20-21, wherein a maximum timing offset value in the range of timing offset values is greater than thirty-two.

Aspect 23: The method of Aspect 22, wherein a minimum timing offset value in the range of timing offset values is defined according to a shift that is based at least in part on a minimum scheduling offset associated with the subcarrier spacing.

Aspect 24: The method of any of Aspects 13-23, wherein the subcarrier spacing is at least 480 kHz.

Aspect 25: A method of wireless communication performed by a UE, comprising: receiving, from a network node, a PDCCH that schedules a PDSCH; determining a timing offset between the PDSCH and a PUCCH to carry ACK/NACK feedback for the PDSCH, wherein the timing offset between the PDSCH and the PUCCH is based at least in part on a subcarrier spacing; and transmitting, after reception of the PDSCH, the PUCCH to carry the ACK/NACK feedback for the PDSCH based at least in part on the timing offset.

Aspect 26: The method of Aspect 25, wherein determining the timing offset between the PDSCH and the PUCCH includes: determining that fallback DCI carried in the PDCCH includes an indicated value for the timing offset in a default range; and shifting the indicated value for the timing offset based at least in part on a parameter having a constant value.

Aspect 27: The method of Aspect 26, wherein the indicated value for the timing offset is shifted by adding the constant value and the indicated value for the timing offset.

Aspect 28: The method of Aspect 26, wherein the indicated value for the timing offset is shifted by multiplying the constant value and the indicated value for the timing offset.

Aspect 29: The method of any of Aspects 26-28, wherein the constant value is based at least in part on the subcarrier spacing.

Aspect 30: The method of any of Aspects 26-28, wherein the constant value is based at least in part on a decoding time associated with the PDSCH.

Aspect 31: The method of Aspect 25, wherein the timing offset between the PDSCH and the PUCCH is indicated in a default TDRA table associated with the subcarrier spacing.

Aspect 32: The method of any of Aspects 25-31, further comprising: receiving, from the network node, a SIB that indicates a configuration for determining the timing offset, wherein the timing offset is determined using the configuration indicated in the SIB based at least in part on the PDCCH carrying DCI having a fallback format.

Aspect 33: The method of Aspect 25, wherein determining the timing offset between the PDSCH and the PUCCH includes: determining that non-fallback DCI carried in the PDCCH includes an indicated value for the timing offset in a range that is based at least in part on the subcarrier spacing.

Aspect 34: The method of Aspect 33, further comprising: receiving an RRC configuration that includes a table indicating a range of timing offset values between the PDSCH and the PUCCH; and applying a shift to one or more entries in the table to define the range that is based at least in part on the subcarrier spacing.

Aspect 35: The method of Aspect 34, wherein the table includes one or more entries that indicate timing offset values to which the shift is not applied.

Aspect 36: The method of any of Aspects 25-32, wherein the timing offset has a maximum value greater than eight slots based at least in part on the PDCCH carrying DCI having a fallback format.

Aspect 37: The method of any of Aspects 25 or 33-35, wherein the timing offset has a maximum value greater than fifteen slots based at least in part on the PDCCH carrying DCI having a non-fallback format.

Aspect 38: The method of any of Aspects 25-37, wherein the subcarrier spacing is at least 480 kHz.

Aspect 39: A method of wireless communication performed by a network node, comprising: transmitting, to a UE, a PDCCH that schedules a PDSCH; determining a timing offset between the PDSCH and a PUCCH to carry ACK/NACK feedback for the PDSCH, wherein the timing offset between the PDSCH and the PUCCH is based at least in part on a subcarrier spacing; and receiving, after transmission of the PDSCH, the PUCCH that carries ACK/NACK feedback for the PDSCH based at least in part on the timing offset.

Aspect 40: The method of Aspect 39, wherein the PDCCH carries fallback DCI that includes an indicated value for the timing offset in a default range, and wherein the indicated value for the timing offset is shifted based at least in part on a parameter having a constant value.

Aspect 41: The method of Aspect 40, wherein the indicated value for the timing offset is shifted by adding the constant value and the indicated value for the timing offset.

Aspect 42: The method of Aspect 40, wherein the indicated value for the timing offset is shifted by multiplying the constant value and the indicated value for the timing offset.

Aspect 43: The method of any of Aspects 40-42, wherein the constant value is based at least in part on the subcarrier spacing.

Aspect 44: The method of any of Aspects 40-42, wherein the constant value is based at least in part on a decoding time associated with the PDSCH.

Aspect 45: The method of Aspect 39, wherein the timing offset between the PDSCH and the PUCCH is indicated in a default TDRA table associated with the subcarrier spacing.

Aspect 46: The method of any of Aspects 39-45, further comprising: transmitting, to the UE, a SIB that indicates a configuration for determining the timing offset, wherein the timing offset is determined using the configuration indicated in the SIB based at least in part on the PDCCH carrying DCI having a fallback format.

Aspect 47: The method of Aspect 39, wherein the PDCCH carries non-fallback DCI that includes an indicated value for the timing offset in a range that is based at least in part on the subcarrier spacing.

Aspect 48: The method of Aspect 47, further comprising: transmitting, to the UE, an RRC configuration that includes a table indicating a range of timing offset values between the PDSCH and the PUCCH; and applying a shift to one or more entries in the table to define the range that is based at least in part on the subcarrier spacing.

Aspect 49: The method of Aspect 48, wherein the table includes one or more entries that indicate timing offset values to which the shift is not applied.

Aspect 50: The method of any of Aspects 39-46, wherein the timing offset has a maximum value greater than eight slots based at least in part on the PDCCH carrying DCI having a fallback format.

Aspect 51: The method of any of Aspects 39 or 47-49, wherein the timing offset has a maximum value greater than fifteen slots based at least in part on the PDCCH carrying DCI having a non-fallback format.

Aspect 52: The method of any of Aspects 39-51, wherein the subcarrier spacing is at least 480 kHz.

Aspect 53: An apparatus for wireless communication at a device, comprising: a processor; memory coupled with the processor; and instructions stored in the memory and executable by the processor to cause the apparatus to perform the method of any of Aspects 1-12.

Aspect 54: A device for wireless communication, comprising a memory and one or more processors coupled to the memory, the one or more processors configured to perform the method of any of Aspects 1-12.

Aspect 55: An apparatus for wireless communication, comprising at least one means for performing the method of any of Aspects 1-12.

Aspect 56: A non-transitory computer-readable medium storing code for wireless communication, the code comprising instructions executable by a processor to perform the method of any of Aspects 1-12.

Aspect 57: A non-transitory computer-readable medium storing a set of instructions for wireless communication, the set of instructions comprising one or more instructions that, when executed by one or more processors of a device, cause the device to perform the method of any of Aspects 1-12.

Aspect 58: An apparatus for wireless communication at a device, comprising: a processor; memory coupled with the processor; and instructions stored in the memory and executable by the processor to cause the apparatus to perform the method of any of Aspects 13-24.

Aspect 59: A device for wireless communication, comprising a memory and one or more processors coupled to the memory, the one or more processors configured to perform the method of any of Aspects 13-24.

Aspect 60: An apparatus for wireless communication, comprising at least one means for performing the method of any of Aspects 13-24.

Aspect 61: A non-transitory computer-readable medium storing code for wireless communication, the code comprising instructions executable by a processor to perform the method of any of Aspects 13-24.

Aspect 62: A non-transitory computer-readable medium storing a set of instructions for wireless communication, the set of instructions comprising one or more instructions that, when executed by one or more processors of a device, cause the device to perform the method of any of Aspects 13-24.

Aspect 63: An apparatus for wireless communication at a device, comprising: a processor; memory coupled with the processor; and instructions stored in the memory and executable by the processor to cause the apparatus to perform the method of any of Aspects 25-38.

Aspect 64: A device for wireless communication, comprising a memory and one or more processors coupled to the memory, the one or more processors configured to perform the method of any of Aspects 25-38.

Aspect 65: An apparatus for wireless communication, comprising at least one means for performing the method of any of Aspects 25-38.

Aspect 66: A non-transitory computer-readable medium storing code for wireless communication, the code comprising instructions executable by a processor to perform the method of any of Aspects 25-38.

Aspect 67: A non-transitory computer-readable medium storing a set of instructions for wireless communication, the set of instructions comprising one or more instructions that, when executed by one or more processors of a device, cause the device to perform the method of any of Aspects 25-38.

Aspect 68: An apparatus for wireless communication at a device, comprising a processor; memory coupled with the processor; and instructions stored in the memory and executable by the processor to cause the apparatus to perform the method of any of Aspects 39-52.

Aspect 69: A device for wireless communication, comprising a memory and one or more processors coupled to the memory, the one or more processors configured to perform the method of any of Aspects 39-52.

Aspect 70: An apparatus for wireless communication, comprising at least one means for performing the method of any of Aspects 39-52.

Aspect 71: A non-transitory computer-readable medium storing code for wireless communication, the code comprising instructions executable by a processor to perform the method of any of Aspects 39-52.

Aspect 72: A non-transitory computer-readable medium storing a set of instructions for wireless communication, the set of instructions comprising one or more instructions that, when executed by one or more processors of a device, cause the device to perform the method of any of Aspects 39-52.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a network node, a physical downlink control channel (PDCCH) that includes a grant for a communication scheduled via the PDCCH prior to a radio resource control (RRC) configuration indicating a timing offset between the PDCCH and the communication scheduled via the PDCCH, wherein:
         the timing offset includes a k0 parameter based at least in part on the communication including a physical downlink shared channel, or
         the timing offset includes a k2 parameter based at least in part on the communication including a physical uplink shared channel; and
      determine a timing offset between the PDCCH and the communication scheduled via the PDCCH based at least in part on a default time domain resource assignment (TDRA) table for a subcarrier spacing associated with the communication, wherein the default TDRA table indicates a maximum value for the timing offset that is based at least in part on a default PDCCH monitoring periodicity defined for the subcarrier spacing associated with the communication.

2. The UE of claim 1, wherein the timing offset is associated with a start and length indicator value that covers a whole slot based at least in part on the k0 parameter having a value greater than zero.

3. The UE of claim 1, wherein the one or more processors are further configured to:
receive an RRC configuration that includes a table indicating a range of timing offset values between a subsequent PDCCH and a subsequent communication scheduled via the subsequent PDCCH, wherein the range of timing offset values indicated in the table is based at least in part on the subcarrier spacing.

4. The UE of claim 1, wherein the subcarrier spacing is at least 480 kilohertz.

5. A network node for wireless communication, comprising:
one or more memories; and
one or more processors, coupled to the one or more memories, configured to:
transmit, to a user equipment (UE), a physical downlink control channel (PDCCH) that includes a grant for a communication scheduled via the PDCCH prior to a radio resource control (RRC) configuration indicating a timing offset between the PDCCH and the communication scheduled via the PDCCH, wherein:
the timing offset includes a k0 parameter based at least in part on the communication including a physical downlink shared channel, or
the timing offset includes a k2 parameter based at least in part on the communication including a physical uplink shared channel; and
determine a timing offset between the PDCCH and the communication scheduled via the PDCCH based at least in part on a default time domain resource assignment (TDRA) table for a subcarrier spacing associated with the communication, wherein the default TDRA table indicates a maximum value for the timing offset that is based at least in part on a default PDCCH monitoring periodicity defined for the subcarrier spacing associated with the communication.

6. The network node of claim 5, wherein the timing offset is associated with a start and length indicator value that covers a whole slot based at least in part on the k0 parameter having a value greater than zero.

7. The network node of claim 5, wherein the one or more processors are further configured to:
transmit, to the UE, an RRC configuration that includes a table indicating a range of timing offset values between a subsequent PDCCH and a subsequent communication scheduled via the subsequent PDCCH, wherein the range of timing offset values indicated in the table is based at least in part on the subcarrier spacing.

8. The network node of claim 5, wherein the subcarrier spacing is at least 480 kilohertz.

* * * * *